US011760357B2

(12) United States Patent
Tokunaga et al.

(10) Patent No.: US 11,760,357 B2
(45) Date of Patent: Sep. 19, 2023

(54) TRAVEL EVALUATION METHOD AND PSEUDO-EMOTION GENERATION METHOD

(71) Applicant: KAWASAKI MOTORS, LTD., Akashi (JP)

(72) Inventors: Hisato Tokunaga, Nishinomiya (JP); Kazuhiro Ichikawa, Akashi (JP)

(73) Assignee: KAWASAKI MOTORS, LTD., Akashi (JP)

( * ) Notice: Subject to any disclaimer, the term of this patent is extended or adjusted under 35 U.S.C. 154(b) by 21 days.

(21) Appl. No.: 16/626,818

(22) PCT Filed: Jun. 27, 2018

(86) PCT No.: PCT/JP2018/024452
§ 371 (c)(1),
(2) Date: Dec. 26, 2019

(87) PCT Pub. No.: WO2019/004312
PCT Pub. Date: Jan. 3, 2019

(65) Prior Publication Data
US 2020/0130700 A1   Apr. 30, 2020

(30) Foreign Application Priority Data

Jun. 27, 2017 (WO) .................. PCT/JP2017/023557

(51) Int. Cl.
*B60W 40/09* (2012.01)
*B60W 10/10* (2012.01)
(Continued)

(52) U.S. Cl.
CPC ............ *B60W 40/08* (2013.01); *B60W 40/09* (2013.01); *B60W 40/10* (2013.01); *B60W 40/12* (2013.01);
(Continued)

(58) Field of Classification Search
None
See application file for complete search history.

(56) References Cited

U.S. PATENT DOCUMENTS 6,175,772 B1    1/2001  Kamiya et al.
6,459,980 B1   10/2002  Tabata et al.
(Continued)

FOREIGN PATENT DOCUMENTS

DE    102005059216 A1    1/2007
DE    102010029428 A1   12/2011
(Continued)

OTHER PUBLICATIONS

Rajamani, Rajesh, "Vehicle Dynamics and Control," 2012, Springer, second edition, pp. 395-398 (Year: 2012).*

(Continued)

*Primary Examiner* — Aniss Chad
*Assistant Examiner* — Madison R Hughes
(74) *Attorney, Agent, or Firm* — Alleman Hall Creasman & Tuttle LLP

(57) ABSTRACT

Provided is a travel evaluation method of making an evaluation related to travel of a vehicle capable of traveling in a leaning position, the method including: obtaining a tire force which is an external force exerted on a wheel of the vehicle from a ground surface; and deriving an evaluation index related to travel of the vehicle. The evaluation index includes a positive evaluation index as a rating of a positive evaluation related to travel of the vehicle. In deriving the evaluation index, the positive evaluation index is set higher as the tire force increases, and the evaluation index is corrected based on an influential parameter other than the tire force.

13 Claims, 8 Drawing Sheets

(51) Int. Cl.
*B60W 40/12* (2012.01)
*B60W 40/08* (2012.01)
*B60W 40/13* (2012.01)
*B60W 40/10* (2012.01)
*B60W 50/00* (2006.01)

(52) U.S. Cl.
CPC ..... *B60W 40/13* (2013.01); *B60W 2040/1307* (2013.01); *B60W 2040/1384* (2013.01); *B60W 2300/36* (2013.01); *B60W 2510/202* (2013.01); *B60W 2520/18* (2013.01); *B60W 2530/20* (2013.01); *B60W 2552/00* (2020.02); *B60W 2554/00* (2020.02)

(56) References Cited

U.S. PATENT DOCUMENTS

| | | | | |
|---|---|---|---|---|
| 8,855,912 | B2* | 10/2014 | Miura | G01C 21/3697 |
| | | | | 701/400 |
| 9,074,544 | B2 | 7/2015 | Noumura et al. | |
| 9,840,239 | B2* | 12/2017 | Meier | B60T 8/171 |
| 10,065,636 | B2* | 9/2018 | Varnhagen | B60T 8/17551 |
| 10,112,675 | B2* | 10/2018 | Takenaka | B62K 21/18 |
| 10,166,919 | B2* | 1/2019 | Weisswange | B60W 40/08 |
| 10,207,762 | B2* | 2/2019 | Takenaka | B60W 30/025 |
| 10,352,262 | B2* | 7/2019 | Jun | B62D 15/021 |
| 10,369,977 | B2* | 8/2019 | D' Addetta | B60W 40/112 |
| 10,417,837 | B2* | 9/2019 | Stanek | G07C 5/0808 |
| 10,431,089 | B1* | 10/2019 | Nguyen | B60Q 9/00 |
| 10,661,776 | B1* | 5/2020 | Kook | B60W 10/11 |
| 10,691,197 | B2* | 6/2020 | Yoneda | G06Q 30/0269 |
| 10,710,582 | B2* | 7/2020 | Ooba | B62D 5/0463 |
| 10,752,260 | B2* | 8/2020 | Oe | G01C 21/3641 |
| 10,787,162 | B2* | 9/2020 | Niu | F16H 59/48 |
| 2001/0001318 | A1* | 5/2001 | Kamiya | F24F 11/30 |
| | | | | 700/246 |
| 2003/0060937 | A1 | 3/2003 | Shinada et al. | |
| 2005/0103100 | A1* | 5/2005 | Miyoshi | G01L 5/164 |
| | | | | 73/146 |
| 2005/0234628 | A1* | 10/2005 | Luders | B60T 8/1725 |
| | | | | 701/80 |
| 2010/0174437 | A1 | 7/2010 | Benedict et al. | |
| 2011/0043635 | A1 | 2/2011 | Fujita et al. | |
| 2011/0077835 | A1 | 3/2011 | Otsuka | |
| 2011/0231050 | A1* | 9/2011 | Goulding | G05D 1/0891 |
| | | | | 701/26 |
| 2012/0181765 | A1* | 7/2012 | Hill | B62K 5/027 |
| | | | | 280/62 |
| 2012/0296544 | A1* | 11/2012 | Kondoh | B60W 50/0205 |
| | | | | 701/99 |
| 2013/0166101 | A1 | 6/2013 | Noumura et al. | |
| 2013/0197795 | A1* | 8/2013 | Basnayake | G01C 21/30 |
| | | | | 701/412 |
| 2013/0282253 | A1* | 10/2013 | Ono | B60T 8/1755 |
| | | | | 701/72 |
| 2013/0335449 | A1* | 12/2013 | Johnson | G06T 13/40 |
| | | | | 345/634 |
| 2015/0112569 | A1* | 4/2015 | Yamane | B60W 30/18145 |
| | | | | 701/72 |
| 2015/0127240 | A1* | 5/2015 | Nozawa | B60W 10/06 |
| | | | | 701/82 |
| 2015/0309512 | A1* | 10/2015 | Cudak | B60W 30/00 |
| | | | | 701/23 |
| 2016/0153511 | A1 | 6/2016 | Dickinson et al. | |
| 2016/0159366 | A1* | 6/2016 | Tsuyunashi | B60W 40/09 |
| | | | | 340/439 |
| 2016/0247394 | A1* | 8/2016 | Stenneth | G07C 5/008 |
| 2017/0011562 | A1* | 1/2017 | Hodges | G08G 1/096741 |
| 2017/0129495 | A1* | 5/2017 | Eguchi | B60W 10/08 |
| 2017/0229015 | A1* | 8/2017 | Shimamori | G08G 1/09675 |
| 2017/0236395 | A1 | 8/2017 | Cech | |
| 2017/0236411 | A1* | 8/2017 | Sumers | G06K 9/6293 |
| | | | | 701/117 |
| 2018/0174457 | A1* | 6/2018 | Taylor | G06K 9/00302 |
| 2018/0265055 | A1* | 9/2018 | Hasegawa | B60T 8/1755 |
| 2018/0265117 | A1* | 9/2018 | Hara | G05D 1/0891 |
| 2018/0342005 | A1* | 11/2018 | Yuhara | H04W 4/48 |
| 2019/0051413 | A1* | 2/2019 | Son | G06N 3/008 |
| 2019/0248376 | A1* | 8/2019 | Tokunaga | B60W 40/10 |
| 2019/0294867 | A1* | 9/2019 | Goto | G06K 9/00845 |
| 2019/0300004 | A1* | 10/2019 | Goto | G07C 5/0841 |

FOREIGN PATENT DOCUMENTS

| | | | | |
|---|---|---|---|---|
| DE | 102014205070 A1 * | 9/2015 | | B60W 30/14 |
| DE | 102015218830 A1 | 3/2017 | | |
| JP | H10289006 A | 10/1998 | | |
| JP | 2003072488 A | 3/2003 | | |
| JP | WO2008038374 A1 * | 4/2008 | | B60R 16/02 |
| JP | 2009520643 A | 5/2009 | | |
| JP | 2012056541 A | 3/2012 | | |
| JP | 2015085905 A | 5/2015 | | |
| JP | 2016110449 A | 6/2016 | | |
| JP | 2018083583 A * | 5/2018 | | |
| WO | 2008038374 A1 | 4/2008 | | |

OTHER PUBLICATIONS

Weber, J., "Automotive Development Processes: Processes for Successful Customer Oriented Vehicle Development," Springer Science & Business Media, Jun. 22, 2009, 320 pages.

"Kurvenlage," GQ, Available Online at www.gq-magazin.de/auto-technik/article/gq-drive-fahrspass, Nov. 15, 2017, 7 pages. See NPL Documents No. 2 for explanation of relevance.

European Patent Office, Extended European Search Report Issued in Application No. 18822933.0, dated Feb. 1, 2021, Germany, 9 pages.

* cited by examiner

TRAVEL EVALUATION METHOD AND PSEUDO-EMOTION GENERATION METHOD

TECHNICAL FIELD

The present invention relates to a method of making an evaluation related to travel of a vehicle capable of traveling in a leaning position.

BACKGROUND ART

Recently, there has been proposed logics for making an evaluation related to travel using criteria based on emotions, such as whether the travel is pleasant. For example, Patent Literature 1 discloses a logic applicable to a motorcycle which is an exemplary vehicle capable of traveling in a leaning position. With this logic, a pseudo-emotion of the vehicle is generated based on an emotion model in which driving maneuvers are associated with emotions.

CITATION LIST

Patent Literature

Patent Literature 1: Japanese Laid-Open Patent Application Publication No. H10-289006

SUMMARY OF INVENTION

Technical Problem

However, with the conventional logic, an emotion experienced by the driver during travel (or an evaluation made by the driver for the travel) and a pseudo-emotion generated (or an evaluation indicator generated) may be weakly correlated.

An object of the present invention is to provide a travel evaluation method with which an evaluation indicator strongly correlated with an evaluation made by the driver can be obtained.

Solution to Problem

A travel evaluation method according to an aspect of the present invention is a method of making an evaluation related to travel of a vehicle capable of traveling in a leaning position, the method including: obtaining a tire force which is an external force exerted on a wheel of the vehicle from a ground surface; and deriving an evaluation index related to travel of the vehicle, wherein the evaluation index includes a positive evaluation index as a rating of a positive evaluation related to travel of the vehicle, in deriving the evaluation index, the positive evaluation index is set higher as the tire force increases, and in deriving the evaluation index, the evaluation index is corrected based on an influential parameter other than the tire force.

With the above configuration, since an evaluation can be made for travel based on parameters including the tire force and a parameter other than the tire force, the evaluation result can be made closer to an evaluation made by the driver.

Advantageous Effects of Invention

The present invention makes it possible to obtain an evaluation indicator strongly correlated with an evaluation made by the driver.

DESCRIPTION OF EMBODIMENTS

Hereinafter, embodiments will be described with reference to the drawings. Throughout the drawings, the same or corresponding elements are denoted by the same reference signs, and detailed explanation of these elements will not be repeated. In the present specification, the symbol "dot" in the Newton's notation may be placed on the right of an alphabetical character representing a variable. The upward, downward, forward, rearward, leftward, and rightward directions are defined with respect to the direction in which the driver of a vehicle faces.

Figure 1:
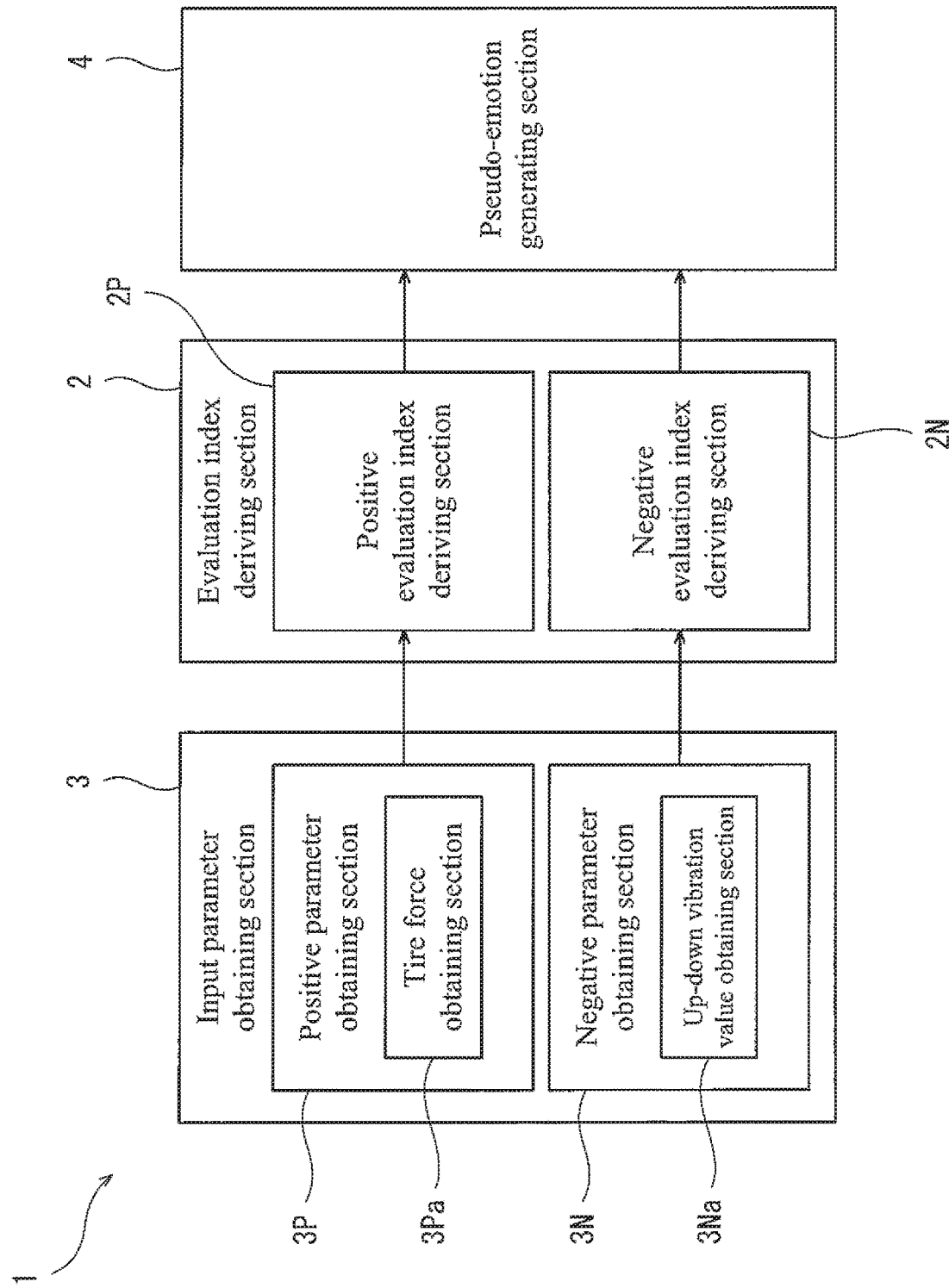
FIG. 1 is a conceptual diagram showing a pseudo-emotion generation system that generates a pseudo-emotion of a vehicle.

FIG. 1 is a conceptual diagram showing a pseudo-emotion generation system 1 that generates a pseudo-emotion of a vehicle. The pseudo-emotion generation system 1 is applicable to vehicles having at least one wheel. The term "wheel" is used herein to refer to an assembly including a narrowly defined wheel having a hub, a rim, and a spoke and a tire mounted on the rim to contact the ground surface.

The pseudo-emotion generation system 1 includes: an evaluation index deriving section 2 that derives an emotion evaluation index as a rating of a pseudo-emotion of a vehicle; an input parameter obtaining section 3 that obtains an input parameter used by the evaluation index deriving section 2 to derive the emotion evaluation index; and a pseudo-emotion generating section 4 that generates the pseudo-emotion of the vehicle based on the emotion evaluation index derived by the evaluation index deriving section 2.

The "emotion evaluation index" includes a "positive evaluation index" as a rating of a positive pseudo-emotion of the vehicle and a "negative evaluation index" as a rating of a negative pseudo-emotion of the vehicle. The positive evaluation index represents the presence/absence and/or the intensity of a positive emotion and contributes to quantitative evaluation of the positive emotion. The negative evaluation index serves in the same manner for a negative emotion. In an example, the positive evaluation index and the negative evaluation index may be expressed by numerical values. The "input parameter" includes a "positive parameter" used for derivation of the positive evaluation index and a "negative parameter" used for derivation of the negative evaluation index.

The evaluation index deriving section 2 includes a positive evaluation index deriving section 2P that derives the positive evaluation index and a negative evaluation index deriving section 2N that derives the negative evaluation index. The input parameter obtaining section 3 includes a positive parameter obtaining section 3P that obtains the positive parameter and a negative parameter obtaining section 3N that obtains the negative parameter.

In the present embodiment, the positive parameter includes a "tire force", and the positive parameter obtaining section 3P includes a tire force obtaining section 3Pa that obtains the tire force. In the present embodiment, the negative parameter includes an "up-down vibration value", and the negative parameter obtaining section 3N includes an up-down vibration value obtaining section 3Na that obtains the up-down vibration value. The positive parameter may further include a parameter other than the tire force, and the negative parameter may further include a parameter other than the up-down vibration value.

The input parameter obtaining section 3 obtains values of the input parameter at predetermined time intervals. The evaluation index deriving section 2 derives values of the emotion evaluation index based on the input parameter at predetermined time intervals. The "predetermined time intervals" may be, for example, 5 milliseconds. The time intervals for derivation of the evaluation index may be equal to or larger than the time intervals for obtainment of the input parameter.

A value obtained at a certain time point for the input parameter or the emotion evaluation index will hereinafter be referred to as an "instantaneous value". A plurality of instantaneous values are obtained over time. Among the instantaneous values, the instantaneous value that has been obtained last is referred to as a "latest value", and the values other than the latest value are referred to as "past values". The instantaneous value obtained immediately before the latest value is referred to as a "previous value" (the past values include the previous value). An instantaneous value of the emotion evaluation index is obtained based on an instantaneous value of the input parameter obtained at the time of derivation of the instantaneous value of the emotion evaluation index. Thus, the instantaneous value of the emotion evaluation index is obtained independently of instantaneous values of the emotion evaluation index which have been derived before derivation of the instantaneous value of interest and hence independently of instantaneous values of the input parameter which have been obtained before derivation of the instantaneous value of interest. A past value of the emotion evaluation index may be referred to as a "past emotion evaluation index". Hereinafter, an instantaneous value to be described may be suffixed with a symbol "(k)" (for example, an instantaneous value of the positive emotion evaluation index may be written as "instantaneous value p(k)"). When the latest value among instantaneous values is described, the latest value may be suffixed with a symbol "(t)" (for example, the latest value of the positive emotion evaluation index may be written as "latest value p(t)"). When a past value among instantaneous values is described, the past value may be suffixed with a symbol "(t−i)", in which "i" represents an integer (for example, a past value of the positive emotion evaluation index may be written as "past value p(t−1) or p(t−2)"). A past value suffixed with the symbol "(t−i)" refers to an instantaneous value obtained at a past time point spaced from the time of obtainment of the latest value by an amount corresponding to the integer "i" multiplied by a sampling period.

The pseudo-emotion generating section 4 generates a pseudo-emotion based on the positive evaluation index derived by the positive evaluation index deriving section 2P and the negative evaluation index derived by the negative evaluation index deriving section 2N. As described below, the pseudo-emotion generating section 4 derives an overall pseudo-emotion evaluation index of a pseudo-emotion based on a set value Sp(t) of the positive evaluation index and a set value Sn(t) of the negative evaluation index.

A positive emotion of a vehicle refers to a positive emotion that the vehicle would express if the vehicle had emotions. Examples of the positive emotion of the vehicle include: a good emotion (favorable emotion) representing approval for a situation where the driver feels a pleasant emotion; an empathy for the pleasantness experienced by the driver; and a feeling of trust in driving maneuvers of the driver. An example of the pleasant emotion felt by the driver is, for example, an emotion that motivates the driver to enjoy (accept) traveling in and maneuvering the vehicle. Specific examples of such an emotion include feelings of amusement, delight, and comfort and further include a handling feeling that the driver has successfully maneuvered the vehicle at his/her discretion, a feeling of improvement that the driving skill has improved, and a feeling of accomplishment that the driver has successfully performed a difficult maneuver.

A negative emotion of a vehicle refers to a negative emotion that the vehicle would express if the vehicle had emotions. Examples of the negative emotion of the vehicle include: a bad emotion (unfavorable emotion) representing disapproval for a situation where the driver feels an unpleasant emotion; and an empathy for the unpleasantness experienced by the driver. Examples of the unpleasant emotion of the driver include feelings of pain, fatigue, disgust, anger, anxiety, fear, and nervousness. The experience of such a negative emotion may cause the driver to be reluctant to travel in or maneuver the vehicle.

For example, when the positive evaluation index and the negative evaluation index are expressed by numerical rating values, the larger the value of the positive evaluation index is, the stronger is the agreeable (pleasant) emotion felt by the driver and therefore by the vehicle. The larger the value of the negative evaluation index is, the stronger is the disagreeable (unpleasant) emotion felt by the driver and therefore by the vehicle.

For example, if all the emotions felt by the driver during travel are classified into two groups, one of which consists of agreeable emotions and the other of which consists of disagreeable emotions, emotions included in the agreeable emotion group may be regarded as positive emotions and emotions included in the disagreeable emotion group may be regarded as negative emotions. Positive and negative emotions of the vehicle are correlated, respectively, with the driver's positive and negative emotions classified as above.

The pseudo-emotion generating section 4 generates information as a pseudo-emotion of the vehicle, the information being correlated with an emotion expected to be felt by the driver operating the vehicle. Specifically, the pseudo-emotion generating section 4 changes the contents of the information generated as the pseudo-emotion according to whether the expected emotion of the driver is positive or negative. Alternatively, the pseudo-emotion generating section 4 may change the contents of the information generated as the pseudo-emotion according to the level of the expected emotion of the driver.

Figure 2:
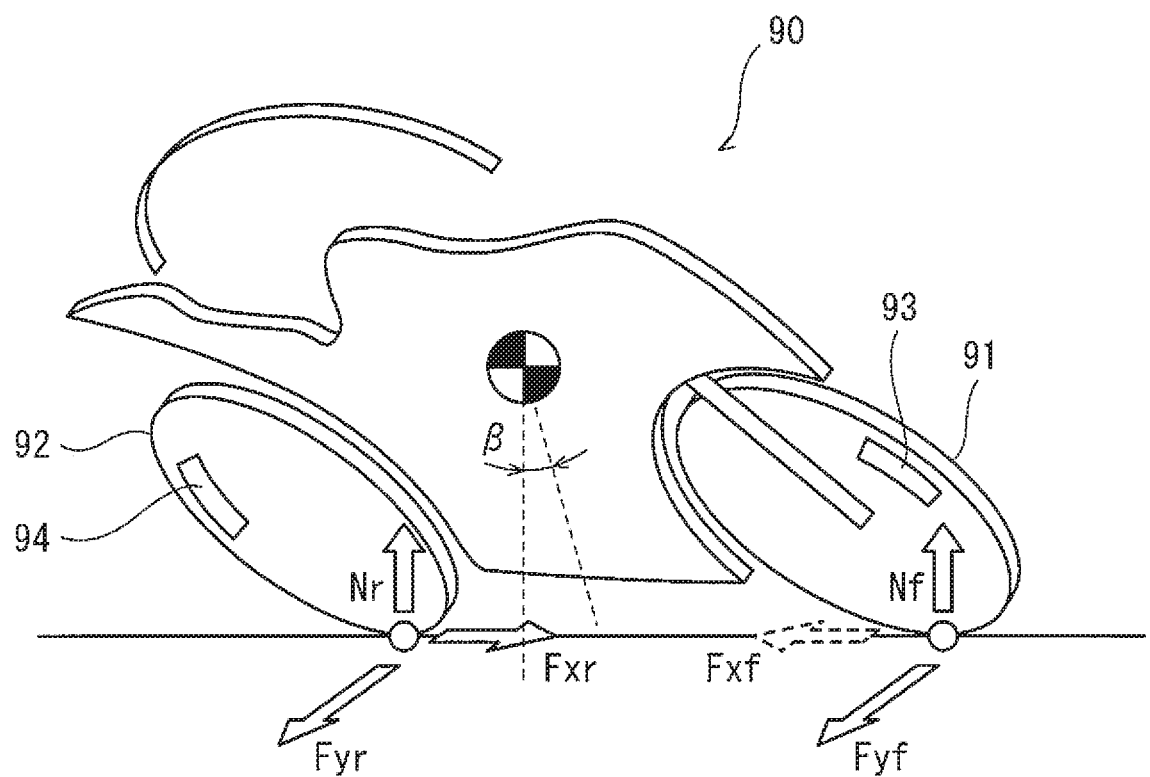
FIG. 2 is a diagram illustrating a tire force exerted from the ground surface on the wheels of a motorcycle described as an exemplary vehicle.

FIG. 2 is a perspective view of a motorcycle 90 described as an exemplary vehicle to which the pseudo-emotion generation system is applied. The motorcycle 90 includes a front wheel 91 and a rear wheel 92. The rear wheel 92 is a drive wheel, and the front wheel 91 is a driven wheel. The motorcycle 90 includes a power source constituted by an engine and/or an electric motor. The torque generated by the power source is transmitted to the rear wheel 92, and thereby the rear wheel 92 is rotationally driven. The motorcycle 90 includes a brake system for braking the wheels 91 and 92. The brake system includes a front brake device 93 that applies a braking force to the front wheel 91 and a rear brake device 94 that applies a braking force to the rear wheel 92. These brake devices 93 and 94 are configured to operate independently of each other. Both of the brake devices 93 and 94 are of the hydraulic type, and the braking force applied by each brake device to a corresponding one of the wheels 91 and 92 is approximately proportional to a brake hydraulic pressure.

The motorcycle 90 is able to travel straight in an upright position where a line passing through the center of the vehicle width extends in a direction perpendicular to the ground surface in front view. The motorcycle 90 is able to turn in a banked position where the vehicle body is inclined about the front-rear axis of the vehicle body with respect to the upright position. The "front-rear axis" is an imaginary axis passing through the ground contact areas of the front and rear wheels 91 and 92. The angle of inclination about the front-rear axis of the vehicle body will hereinafter be referred to as "bank angle $\beta$". In the upright position, the bank angle $\beta$ is zero.

Figure 3:
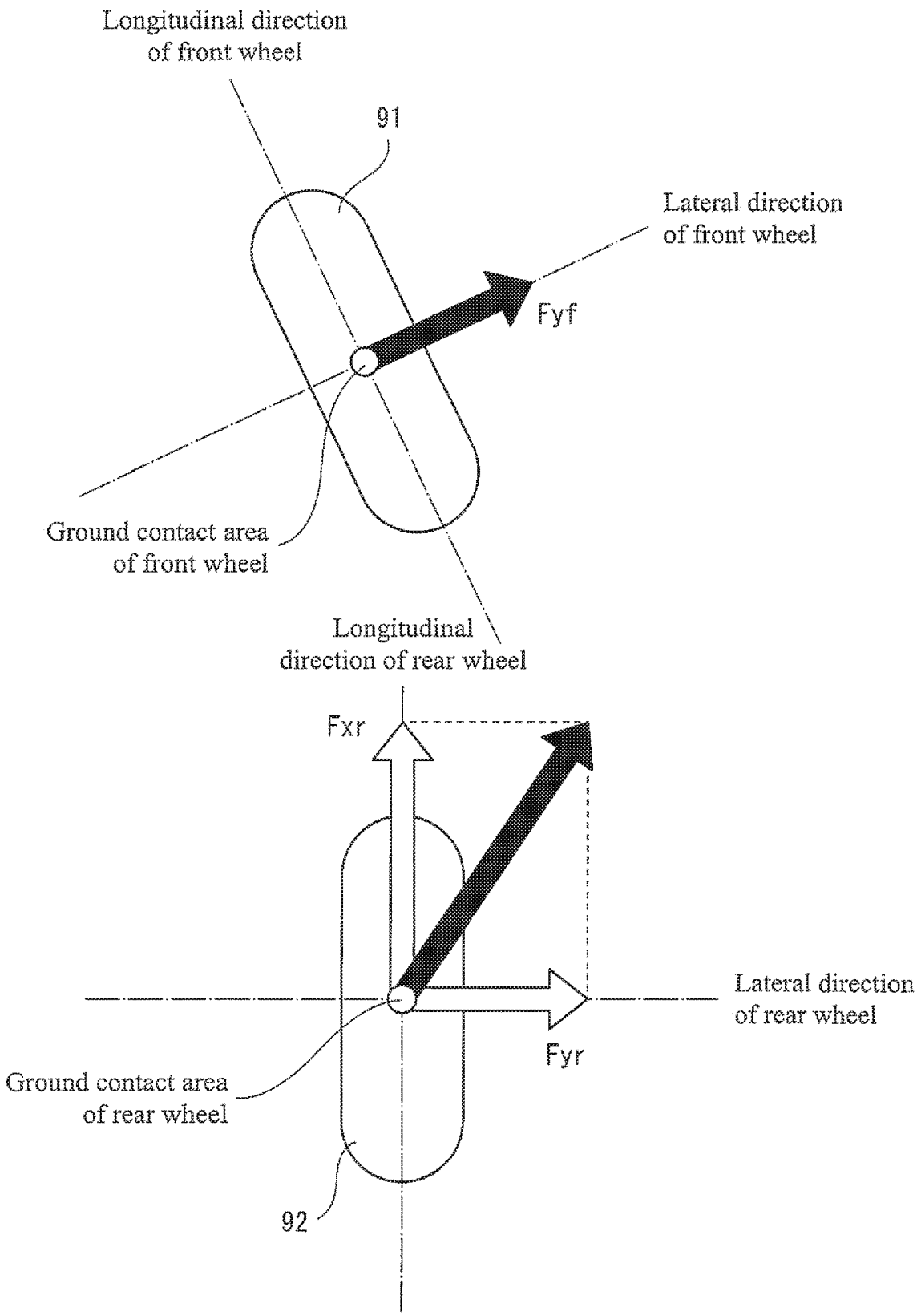
FIG. 3 is a diagram illustrating a horizontal force, a longitudinal force component, and a lateral force component included in the tire force.
Figure 4A:
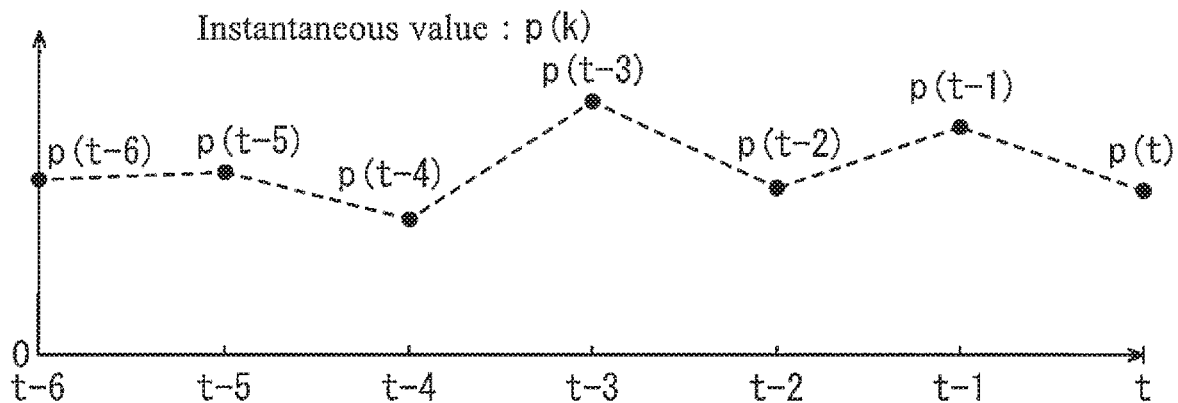
FIG. 4A is a graph showing the time history of instantaneous values of a positive evaluation index.
Figure 4B:
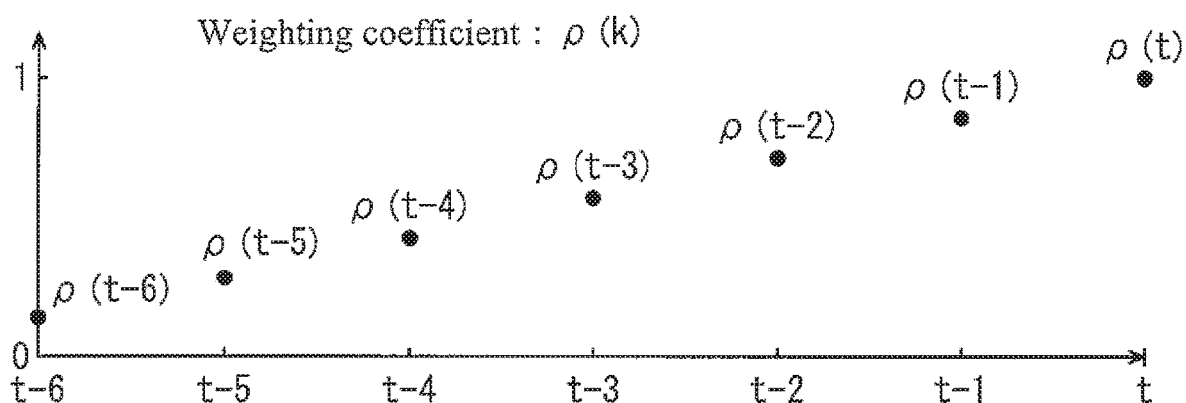
FIG. 4B is a graph showing weighting coefficients.
Figure 4C:
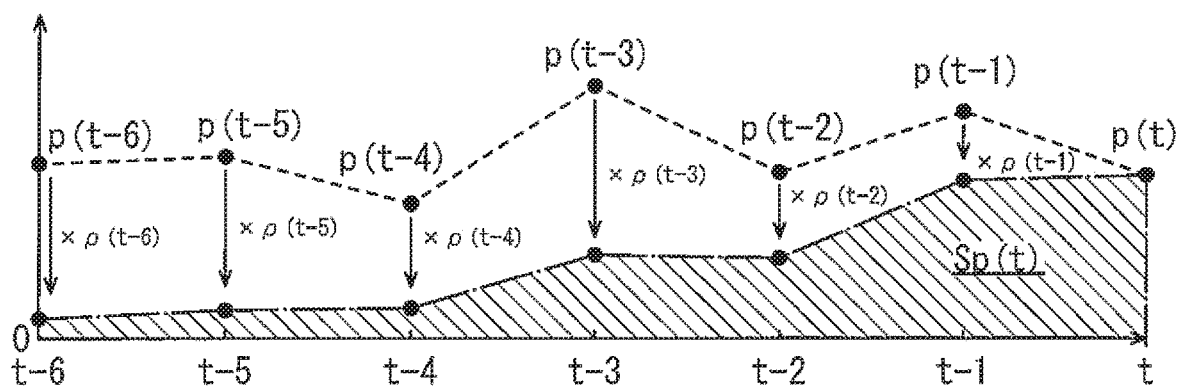
FIG. 4C is a graph showing a set value of the positive evaluation index.

A "tire force" is a force exerted on the wheel 91 and 92 (in particular their ground contact areas) from the ground surface. The tire force can be divided into a "vertical force" and a "horizontal force". The vertical force is a force exerted on the wheels 91 and 92 from the ground surface in a direction perpendicular to the ground surface. The horizontal force is a force acting in a direction perpendicular to the vertical force; that is, the horizontal force is a force exerted on the wheels 91 and 92 from the ground surface in a direction in a plane parallel to the ground surface (the direction is a horizontal direction if the ground surface is horizontal). The horizontal force can be divided into a "longitudinal force component" and a "lateral force component". The longitudinal force component is a force exerted on the wheels 91 and 92 from the ground surface in a longitudinal direction. The lateral force component is a force exerted on the wheels 91 and 92 from the ground surface in a lateral direction. The wheels 91 and 92 as projected on a plane parallel to the ground surface are in the shape of a rounded rectangle (see FIG. 3). The "longitudinal direction" is a direction in which the long sides of the wheels 91 and 92 extend in the plane parallel to the ground surface and substantially coincides with the vehicle lengthwise direction or the forward/rearward direction. The "lateral direction" is a direction perpendicular to the longitudinal direction in the plane parallel to the ground surface and substantially coincides with the vehicle width direction and the leftward/rightward direction.

In the case of the motorcycle 90, the "tire force" includes a "front wheel force" exerted on the front wheel 91 from the ground surface and a "rear wheel force" exerted on the rear wheel 92 from the ground surface. The front wheel force can be divided into a front wheel vertical force and a front wheel horizontal force, and the front wheel horizontal force can be divided into a front wheel longitudinal force component and a front wheel lateral force component. Likewise, the rear wheel force can be divided into a rear wheel vertical force and a rear wheel horizontal force, and the rear wheel horizontal force can be divided into a rear wheel longitudinal force component and a rear wheel lateral force component.

In the present specification, the term "vertical force" is used to include a front wheel vertical force Nf, a rear wheel vertical force Nr, and the sum or average of the vertical forces Nf and Nr. The term "longitudinal force component" is used to include a front wheel longitudinal force component Fxf, a rear wheel longitudinal force component Fxr, and the sum or average of the force components Fxf and Fxr. The term "lateral force component" is used to include a front wheel lateral force component Fyf, a rear wheel lateral force component Fyr, and the sum or average of the force components Fyf and Fyr.

The tire force obtaining section 3Pa may be embodied by a strain sensor that detects the tire force and a tire force dividing section that derives the longitudinal force component and the lateral force component from the tire force detected by the strain sensor. The strain sensor is constituted by a front strain sensor that detects the front wheel force and/or a rear strain sensor that detects the rear wheel force. The tire force dividing section derives the front wheel longitudinal force component and the front wheel lateral force component based on a value detected by the front strain sensor and/or derives the rear wheel longitudinal force component and the rear wheel lateral force component based on a value detected by the rear strain sensor. In this case, the tire force dividing section, together with the positive evaluation index deriving section 2P and the pseudo-emotion generating section 4, is embodied by a control unit mounted in the vehicle.

The tire force obtaining section 3Pa may be embodied by at least one sensor that detects a tire force estimation parameter required for estimation of the tire force and a tire force estimating section that estimates the tire force based on the parameter detected by the sensor. In this case, the tire force estimating section, together with the positive evaluation index deriving section 3P and the pseudo-emotion generating section 4, is embodied by the control unit mounted in the vehicle. Thus, "obtaining" the tire force includes detecting or measuring the tire force by a sensor and also includes estimating the tire force based on a parameter other than the tire force itself.

The parameter used for estimation of the tire force is not limited to a particular one, and examples of the parameter include parameters indicating changes in vehicle behavior, such as the acceleration of the vehicle in the forward/rearward direction, the bank angle $\beta$, and the change over time in bank angle $\beta$. The tire force may be estimated based on the design parameters of the vehicle and the weight of the vehicle (the total weight of the vehicle body, the driver, and the carried load). The tire force obtaining section 3Pa may estimate the tire force using a sensor other than the strain sensors. For example, a change in vehicle body behavior caused by generation of the tire force may be detected, and the tire force may be estimated by back calculation from the change in vehicle body behavior. For example, the tire force may be estimated using a gyro sensor for detecting the vehicle body behavior.

The rear wheel 92 is a drive wheel. Possible main causes of generation of the rear wheel longitudinal force component Fxr include (1) power generated by the power source and transmitted to the rear wheel 92 and (2) a braking force generated by the rear wheel brake device and applied to the rear wheel 92. The direction of the longitudinal force component generated due to the cause (1) is opposite to the direction of the longitudinal force component generated due to the cause (2). The front wheel 91 is a driven wheel. Possible main causes of generation of the front wheel longitudinal force component Fxf include a braking force generated by the front wheel brake device and applied to the front wheel 91.

The front wheel lateral force component Fyf and the rear wheel lateral force component Fyr are generated during turning as reaction forces against a centrifugal force based on the travel speed and the turning radius. The rear wheel lateral force component Fyr includes a component generated in association with a parameter related to the change over time in bank angle β (examples of the parameter include a bank angle velocity β• which is a first-order time derivative of the bank angle β and a bank angle acceleration β•• which is a second-order time derivative of the bank angle β).

Thus, the longitudinal force component increases as the vehicle is sharply accelerated or decelerated by a throttling maneuver or a braking maneuver. The lateral force component increases as the vehicle is caused to turn under the action of centrifugal force by a steering maneuver. The lateral force component is particularly large when the vehicle body is banked laterally (when the bank angle velocity β or the bank angle acceleration β is detected). When the driver is performing a throttling maneuver, braking maneuver, steering maneuver, or vehicle body banking maneuver, the positive emotion as previously described grows strong. That is, the driver experiences an increased intensity of the handling feeling and tends to have the emotions of enjoyment and pleasantness in maneuvering the vehicle. During the above maneuvers, the vehicle is subjected to a large tire force exerted from the ground surface. Thus, with the use of the tire force as the positive parameter, the increased intensity of the handling feeling experienced by the driver can be linked with the increased intensity of the pseudo-emotion of the vehicle via the tire force.

It can be said that the driver regulates the longitudinal force component Fx through a throttling maneuver or a braking maneuver and regulates the lateral force component Fy through a steering maneuver or a vehicle body position changing maneuver (bank angle changing maneuver). The throttling maneuver and braking maneuver have no or little influence on the change in lateral force component Fy, and the steering maneuver and vehicle body position changing maneuver have no or little influence on the change in longitudinal force component Fx.

The positive evaluation index deriving section 2P derives an instantaneous value p(k) of the positive evaluation index based on the tire force which is an example of the positive parameter. In the present embodiment, for example, the instantaneous value p(k) is determined by the following equation (1) based on both an instantaneous value Fx of the longitudinal force component and an instantaneous value Fy of the lateral force component.

$$p(k)=f(Fx,Fy) \quad (1)$$

The horizontal force is a resultant vector of the longitudinal force component Fx and the lateral force component Fy (a square-root of the sum of squares of the longitudinal force component Fx and lateral force component Fy). The instantaneous value p(k) may be determined based on the horizontal force. As previously mentioned, the longitudinal force component Fx includes the front wheel longitudinal force component Fxf and the rear wheel longitudinal force component Fxr, and the lateral force component Fy includes the front wheel lateral force component Fyf and the rear wheel lateral force component Fyr. Thus, the equation (1) can be rewritten into the following equation (2), by which the instantaneous value p(k) may be determined.

$$p(k)=f(Fxf,Fyf,Fxr,Fyr) \quad (2)$$

The instantaneous value p(k) may be an average of a plurality of instantaneous values obtained for the tire force (longitudinal force component and lateral force component) exerted on the wheel 91 and for the tire force (longitudinal force component and lateral force component) exerted on the wheel 92 (the instantaneous values may be referred to as "wheel-by-wheel instantaneous values"). In this case, the equation (2) can be rewritten into the following equation (3), by which the instantaneous value p(k) may be determined.

$$p(k)=\{f(Fxf,Fyf)+f(Fxr,Fyr)\}/2 \quad (3)$$

The function f(Fxf, Fyf) represents a wheel-by-wheel instantaneous value obtained for the front wheel 91 based on the front wheel longitudinal force component Fxf and the front wheel lateral force component Fyf. The function f(Fxr, Fyr) represents a wheel-by-wheel instantaneous value obtained for the rear wheel 92 based on the rear wheel longitudinal force component Fxr and the rear wheel lateral force component Fyr.

The functions f(Fx, Fy), f(Fxf, Fyf, Fxr, Fyr), f(Fxf, Fyf), and f(Fxr, Fyr) may be expressed by any formulae. For example, there is a general tendency that the larger the tire force is, the larger the instantaneous value p(k) is. The larger the horizontal force is, the larger the instantaneous value p(k) is. For example, the larger the longitudinal force components Fx, Fxf, and Fxr are, the larger the instantaneous value p(k) is, and the larger the lateral force components Fy, Fyf, and Fyr are, the larger the instantaneous value p(k) is.

Regardless of which of the equations (1) to (3) is used, the instantaneous value p(k) is determined based on both the longitudinal force component Fx and the lateral force component Fy. In this case, the instantaneous value p(k) may be maximum when both the longitudinal force component Fx and the lateral force component Fy are generated. The instantaneous value p(k) may be larger in the case where both the longitudinal force component Fx and the lateral force component Fy are generated than in the case where only the longitudinal force component Fx or the lateral force component Fy is generated, assuming that the magnitude of the horizontal force is the same between the two cases. That is, when both the longitudinal force component Fx and the lateral force component Fy are generated, the instantaneous value p(k) may be larger than the square-root of the sum of the squares of the two components Fx and Fy. Thus, the instantaneous value p(k) determined may vary depending on the presence/absence or the magnitudes of the longitudinal force component Fx and the lateral force component Fy between different situations where the magnitude of the horizontal force is the same.

For example, the positive evaluation index is maximum when both the longitudinal force component Fx and the lateral force component Fy are generated. In other words, when only either the longitudinal force component Fx or lateral force component Fy is generated, the positive evaluation index is not maximum even if the magnitude of the horizontal force is the same as when the positive evaluation index is maximum. For example, when the magnitude of the longitudinal or lateral force generated is within a predetermined range (e.g., 50 to 150%) relative to the magnitude of the horizontal force or when the angle between the horizontal force and the longitudinal force component Fx or lateral force component Fy is within a predetermined range, the instantaneous value p(k) may be derived by adding an additional value to the horizontal force. The additional value may be larger as the angle between the horizontal force and the longitudinal force component Fx or lateral force component Fy approaches 45 degrees.

The positive evaluation index deriving section 2P does not directly output the latest value p(t) of the positive evaluation index to the pseudo-emotion generating section 4. The positive evaluation index deriving section 2P derives the set value Sp(t) of the positive evaluation index based on the latest value p(t) of the positive evaluation index. The set value Sp(t) of the emotion evaluation index is set in such a manner that the change over time in the set value Sp(t) of the emotion evaluation index is reduced as compared to the change over time in the derived instantaneous value. In the present embodiment, the set value Sp(t) is derived using a plurality of instantaneous values p(t), p(t−1), . . . .

The set value Sp(t) may be an integral determined using the instantaneous values p(t), p(t−1), . . . or a summation of the instantaneous values p(t), p(t−1), . . . . An average may be calculated by dividing the summation by the number of the instantaneous values p(k) summed up. The number of the instantaneous values used for derivation of the set value Sp(t) is not particularly limited.

FIGS. 3A to 3C illustrate an example of how to derive the set value Sp(t). As seen from FIGS. 3A to 3C, the set value Sp(t) of the positive evaluation index is derived in such a manner that the set value Sp(t) of the positive evaluation index is more influenced by a first instantaneous value than by a second instantaneous value derived before derivation of the first instantaneous value. In other words, the set value Sp(t) is corrected based on past emotion evaluation indices derived before the time of derivation of the set value Sp(t). The influence exerted on the set value Sp(t) by a first past emotion evaluation index derived before the time of derivation of the set value Sp(t) is larger than the influence exerted on the set value Sp(t) by a second past emotion evaluation index derived before the time of derivation of the first past emotion evaluation index.

In a specific example, the instantaneous values p(t), p(t−1), . . . used for derivation of the set value Sp(t) may be multiplied by weighting coefficients ρ(t), ρ(t−1), . . . , respectively, and the set value Sp(t) may be derived by calculating the sum of the multiplied instantaneous values p(t)×ρ(t), p(t−1)×ρ(t−1), . . . . In this case, a weighting coefficient ρ(k) is set to a value more than 0 and equal to or less than 1, and a second weighting coefficient associated with the second instantaneous value is set closer to zero than a first weighting coefficient by which the first instantaneous value is multiplied. There is no particular limitation on the manner in which the weighting coefficient decreases depending on when the instantaneous value has been obtained.

The set value Sp(t) of the positive evaluation index derived as above is output to the pseudo-emotion generating section 4.

An up-down vibration value v numerically represents the presence/absence and/or the intensity of vibration of the vehicle in the upward/downward direction. For example, the up-down vibration value obtaining section obtains the up-down vibration value based on a value detected by a vertical acceleration sensor that detects the acceleration az of the vehicle in the upward/downward direction. A specific example of the vertical acceleration sensor is a gyro sensor. The value detected by the vertical acceleration sensor may involve gravity acceleration. In this case, the value detected by the sensor is subjected to computational processing to cancel the gravity acceleration, and then the up-down vibration value v is obtained.

The vertical force included in the tire force is the normal force exerted on the wheel from the ground surface or a parameter positively correlated with the normal force. During up-down vibration, the vertical force varies because an inertial force based on the acceleration az in the upward/downward direction acts on the vehicle body. Thus, the up-down vibration value v may be obtained based on the vertical force.

Vibration of the vehicle body in the upward/downward direction may occur during travel on an uneven road such as a stone-paved road. Upon the occurrence of such vibration, the driver tends to experience a negative emotion such as a feeling of unpleasantness. Thus, with the use of the up-down vibration value v as the negative parameter, the increased intensity of the driver's negative emotion can be linked with the increased intensity of a negative pseudo-emotion of the vehicle via the up-down vibration value v.

The up-down vibration value v represents the up-down vibration at one location of interest. When the up-down vibration value v is determined as described above, the location of interest is a location where the vertical acceleration sensor is mounted. Since the up-down vibration is observed at one location of interest, obtainment of the up-down vibration value v and computation for derivation of the emotion evaluation index are made easier than when the up-down vibration value v is obtained based on up-down vibration at two or more locations (e.g., both of the front and rear wheels).

The location of interest may be a location where the weight of the driver is supported, such as the location of a seat, a handle, or a footrest of the vehicle body. In this case, vibration transmitted from the vehicle body to the driver can be used as the input parameter (negative parameter), and the correlation between up-down vibration and feeling of unpleasantness can be enhanced.

The negative evaluation index deriving section 2N derives an instantaneous value n(k) of the negative evaluation index by the following equation (4) based on the up-down vibration value v which is an example of the negative parameter.

$$n(k)=f(v) \qquad (4)$$

The function f(v) may be expressed by any formula that represents a general tendency that the larger the up-down vibration value v is, the larger the instantaneous value n(k) is.

The negative evaluation index deriving section 2N derives a set value Sn(t) of the negative evaluation index in the same way as the positive evaluation index deriving section 2P derives the set value of the positive evaluation index. The way of deriving the set value is as described above and will not be described again. When the set value Sn(t) is derived using past values and weighting coefficients, the weighting coefficients are set to values more than 0 and equal to or less than 1. The earlier the instantaneous value is obtained, the smaller the weighting coefficient is. The weighting coefficients for the negative evaluation index are set independently of the weighting coefficients for the positive evaluation index. The set value Sn(t) of the negative evaluation index derived as above is output to the pseudo-emotion generating section 4.

The pseudo-emotion generating section 4 generates a pseudo-emotion based on the positive evaluation index (in particular the set value Sp(t)) and the negative evaluation index (in particular the set value Sn(t)). To be precise, the pseudo-emotion generating section 4 generates an overall evaluation index TL of a pseudo-emotion.

In the present embodiment, the set value Sp(t) of the positive evaluation index is derived based on the tire force [newton], while the set value Sn(t) of the negative evaluation index is derived, for example, based on the acceleration az [m/s$^2$] in the upward/downward direction. That is, to numerically rate an emotion, the two set values Sp(t) and Sn(t) are derived based on numerical parameters of different dimensions, respectively. The pseudo-emotion generating section derives a positive emotion level PL based on the set value Sp(t) of the positive evaluation index. The pseudo-emotion generating section also derives a negative emotion level NL based on the set value Sn(t) of the negative evaluation index. The pseudo-emotion generating section synthesizes the two emotion levels PL and NL to derive an overall evaluation index TL of a pseudo-emotion. Specifically, the two set values derived from numerical parameters of different dimensions are converted into numerical values which can be compared or synthesized. This makes it easy to achieve overall pseudo-emotion evaluation that takes into consideration both positive emotions and negative emotions.

Figure 5A:
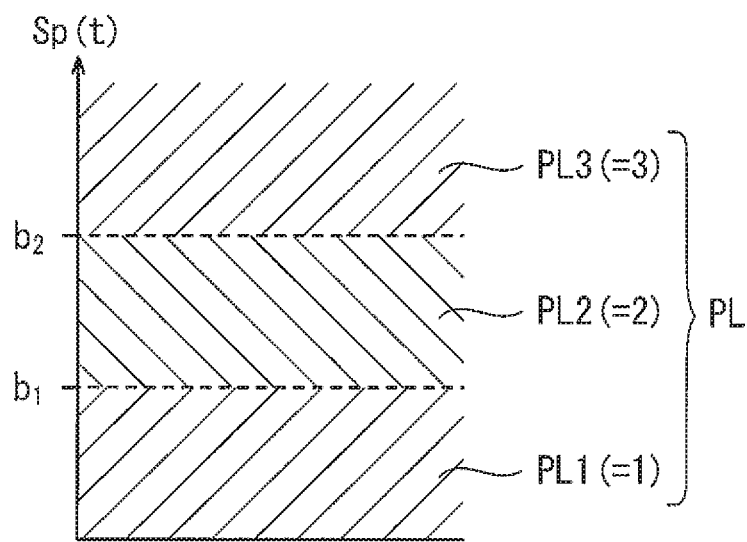
FIG. 5A is a graph showing a positive emotion level.

As shown in FIG. 5A, the pseudo-emotion generating section 4 compares the set value Sp(t) of the positive evaluation index to a plurality of thresholds (e.g., two thresholds b1 and b2) and derives the positive emotion level PL as a result of the comparison. The number of possible values of the positive emotion level PL is equal to the number of the thresholds b1 and b2 plus one. In the illustrated example, two thresholds b1 and b2 are set, and three positive emotion levels PL1 to PL3 are set. The two thresholds include the first threshold b1 and the second threshold b2, and the second threshold b2 is larger than the first threshold b1. If the set value Sp(t) is smaller than the first threshold b1, the positive emotion level PL is set to the first level PL1. If the set value Sp(t) is equal to or larger than the first threshold b1 and smaller than the second threshold b2, the positive emotion level PL is set to the second level PL2. If the set value Sp(t) is equal to or larger than the second threshold b2, the positive emotion level PL is set to the third level PL3.

Figure 5B:
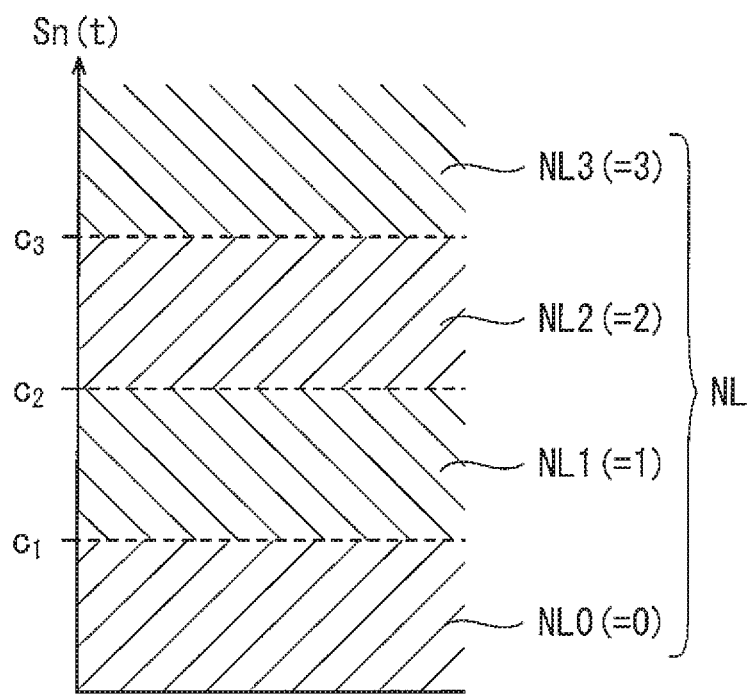
FIG. 5B is a graph showing a negative emotion level.

As shown in FIG. 5B, the pseudo-emotion generating section 4 compares the set value Sn(t) of the negative evaluation index to a plurality of thresholds (e.g., three thresholds c1 to c3) and derives the negative emotion level NL as a result of the comparison. The number of possible values of the negative emotion level NL is equal to the number of the thresholds c1 to c3 plus one. In the illustrated example, three thresholds c1 to c3 are set, and four negative emotion levels NL0 to NL3 are set. Among the three thresholds, the largest is the third threshold c3, the second largest is the second threshold c2, and the smallest is the first threshold c1. If the set value Sn(t) is smaller than the first threshold c1, the negative emotion level NL is set to the zeroth level NL0. If the set value Sn(t) is equal to or larger than the first threshold c1 and smaller than the second threshold c2, the negative emotion level NL is set to the first level NL1. If the set value Sn(t) is equal to or larger than the second threshold c2 and smaller than the third threshold c3, the negative emotion level NL is set to the second level NL2. If the set value Sn(t) is equal to or smaller than the third threshold c3, the negative emotion level NL is set to the third level NL3.

Subsequently, the pseudo-emotion generating section 4 derives an overall evaluation index of a pseudo-emotion based on the value of the positive emotion level PL and the value of the negative emotion level NL. Specifically, the overall evaluation index TL is derived by subtracting the value of the negative emotion level TL from the value of the positive emotion level PL, as expressed by the following equation (5).

$$TL = PL - NL \qquad (5)$$

In other words, if there is a negative emotion derived based on the up-down vibration, a positive emotion derived based on the tire force is canceled by the negative emotion, and it is determined whether the pseudo-emotion of the vehicle is eventually positive or negative. The higher the overall evaluation index TL calculated as described above is, the more positive the pseudo-emotion of the vehicle is.

In the example described above, the value of the positive emotion level can be any of discrete numerical values of 1 to 3. The value of the negative emotion level can be any of discrete numerical values of 0 to 3. For example, if the overall evaluation index TL is equal to or less than 0, the pseudo-emotion generating section 4 generates the emotion of "unpleasantness" as the pseudo-emotion of the vehicle. If the overall evaluation index TL is 1, the emotion of "moderate pleasantness" is generated as the pseudo-emotion of the vehicle. If the overall evaluation index TL is 2, the emotion of "high pleasantness" is generated as the pseudo-emotion of the vehicle. If the overall evaluation index TL is 3, the emotion of "very high pleasantness" is generated as the pseudo-emotion of the vehicle.

Figure 6:
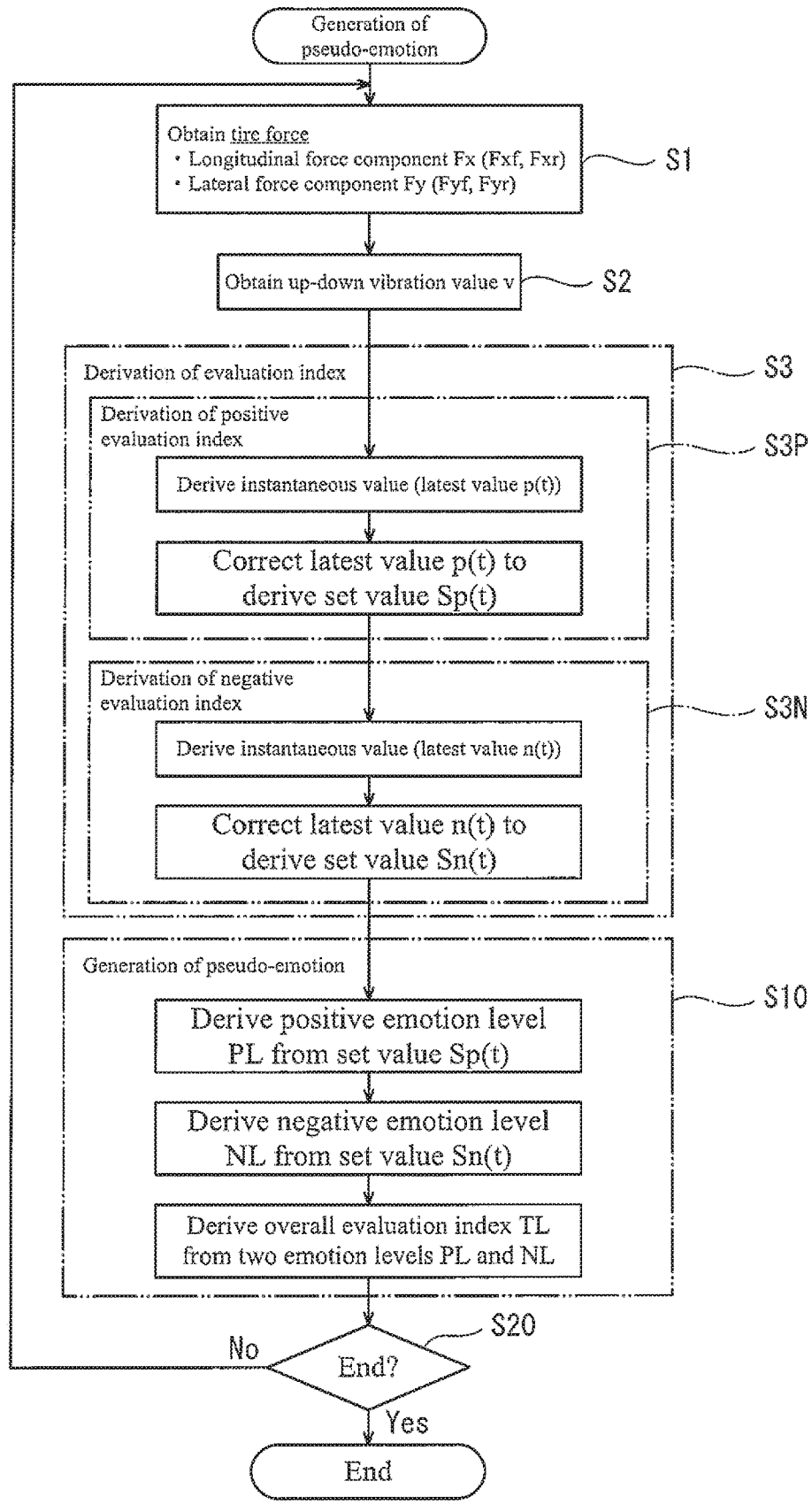
FIG. 6 is a flowchart showing a pseudo-emotion generation method.

A pseudo-emotion generation method according to the present embodiment and the advantage of the method will be described with reference to the flowchart of FIG. 6. The following description overlaps with the foregoing description of the pseudo-emotion generation system 1. The pseudo-emotion generation method is used and carried out by the pseudo-emotion generation system 1.

The pseudo-emotion generation method is a method of generating a pseudo-emotion of a vehicle including wheels, and the method includes: a tire force obtaining step S1 of obtaining a tire force exerted on the wheels 91 and 92 from the ground surface; an evaluation index deriving step S3 of deriving an emotion evaluation index as a numerical rating of a pseudo-emotion; and a pseudo-emotion generating step S10 of generating the pseudo-emotion based on the emotion evaluation index derived in the evaluation index deriving step S3. The pseudo-emotion generating step S10 is followed by determination of whether a predetermined end-of-generation condition under which emotion generation should be ended is satisfied (S20). If the end-of-generation condition is not satisfied (S20: NO), the process restarts from the tire force obtaining step S1 after a sampling interval, and the tire force and emotion evaluation index are sequentially derived. If the end-of-generation condition is satisfied (S20: YES), the process ends.

The emotion evaluation index includes a positive evaluation index p(k), Sp(t) as a numerical rating of a positive emotion. That is, the evaluation index deriving step S3 includes a positive evaluation index deriving step S3P of deriving the positive evaluation index p(k), Sp(t). In this evaluation index deriving step S3 (positive evaluation index deriving step S3P), the positive evaluation index p(k), Sp(t) is derived based on the tire force in such a manner that the larger the tire force is, the higher the positive evaluation index p(k), Sp(t) is.

During sharp acceleration/deceleration or turning, the tire force is likely to increase, and the driver tends to experience a pleasant emotion. With the above method, an increased intensity of pleasant pseudo-emotion of the vehicle can be correlated with an increased intensity of pleasant handling feeling experienced by the driver.

In the tire force obtaining step S1, a longitudinal force component Fx (Fxf, Fxr) exerted on the wheels 91 and 92 from the ground surface in the longitudinal direction and a lateral force component Fy (Fyf, Fyr) exerted on the wheels 91 and 92 from the ground surface in the lateral direction may be obtained as the tire force. In the evaluation index deriving step S3, the positive evaluation index p(k), Sp(t) may be derived based on both the longitudinal force component Fx (Fxf, Fxr) and the lateral force component Fy (Fyf, Fyr).

With this method, since the positive evaluation index p(k), Sp(t) is derived taking into consideration not only the longitudinal force component Fx (Fxf, Fxr) but also the lateral force component Fy (Fyf, Fyr), a pseudo-emotion of the vehicle is generated taking into consideration not only the handling feeling experienced during acceleration or deceleration but also the handling feeling experienced during turning. Thus, the correlation between the pseudo-emotion of the vehicle and the handling feeling experienced by the driver can be further enhanced.

In the evaluation index deriving step S3, the positive evaluation index p(k), Sp(t) derived may be higher when both the longitudinal force component Fx (Fxf, Fxr) and the lateral force component Fy (Fyf, Fyr) are generated than when only the longitudinal force component or lateral force component is generated.

When the vehicle is accelerated or decelerated during straight travel, the lateral force component Fy is unlikely to be generated, and only the longitudinal force component Fx is likely to be generated. During steady circular turning, the longitudinal force component Fx is unlikely to be generated, and only the lateral force component Fy is likely to be generated. An exemplary situation involving generation of both the longitudinal force component Fx (Fxf, Fxr) and the lateral force component Fy (Fyf, Fyr) is a situation where the vehicle is making a turn with acceleration or deceleration. With the method described above, the positive evaluation index p(k), Sp(t) is high particularly when the driver performs an acceleration/deceleration maneuver and a turning maneuver simultaneously and experiences an increased intensity of the handling feeling. Thus, the correlation between the pseudo-emotion of the vehicle and the handling feeling experienced by the driver can be further enhanced. In particular, when both the longitudinal force component Fx and the lateral force component Fy are generated in a vehicle whose vehicle body is banked during turning, the lateral force component Fy, rather than mere acceleration/deceleration, can be taken into consideration to cover handling feeling specific to the banking vehicle making a turn, and thus a pseudo-emotion corresponding to an emotion specific to the driver operating the banking vehicle can be created. In the evaluation index deriving step S3, the positive evaluation index p(k), Sp(t) may be maximum when both the longitudinal force component Fx (Fxf, Fxr) and the lateral force component Fy (Fyf, Fyr) are generated. This can further enhance the correlation between the pseudo-emotion of the vehicle and the handling feeling experienced by the driver.

The emotion evaluation index includes a negative evaluation index n(k), Sn(t) as a numerical rating of a negative emotion. That is, the evaluation index deriving step S3 includes a negative evaluation index deriving step S3N of deriving the negative evaluation index n(k), Sn(t). In the evaluation index deriving step S3 (negative evaluation index deriving step S3N), the negative evaluation index n(k), Sn(t) is derived based on the up-down vibration value v representing the vibration of the vehicle in the upward/downward direction. The pseudo-emotion generation method further includes an up-down vibration value obtaining step S2 of obtaining the up-down vibration value v prior to derivation of the negative evaluation index. In the pseudo-emotion generating step S10, the pseudo-emotion is generated based on the positive evaluation index Sp(t) and the negative evaluation index Sn(t).

When the vehicle vibrates in the upward/downward direction during travel, the driver tends to experience a negative emotion such as a feeling of unpleasantness. With the above method, the increased intensity of unpleasant pseudo-emotion of the vehicle can be correlated with the increased intensity of unpleasantness felt by the driver via the up-down vibration value v. Additionally, the pseudo-emotion is generated taking into consideration the positive evaluation index derived based on the tire force and the negative evaluation index derived based on the up-down vibration value v. As such, the correlation between the pseudo-emotion of the vehicle and the handling feeling experienced by the driver can be further enhanced.

In the pseudo-emotion generating step S10, the overall evaluation index of the pseudo-emotion is derived based on the positive evaluation index Sp(t) and the negative evaluation index Sn(t). With this method, the pseudo-emotion is generated based on the overall evaluation index derived taking into consideration the positive evaluation index Sp(t) and the negative evaluation index Sn(t). Since the overall evaluation index is output, the emotion of the vehicle can more easily be understood than when the positive and negative evaluation indices are individually output.

In the evaluation index deriving step S3 (positive evaluation index deriving step S3P and negative evaluation index deriving step S3N), instantaneous values p(k), n(k) of the emotion evaluation index are sequentially derived at predetermined time intervals, and the latest values p(t), n(t) of the derived instantaneous values are corrected to derive the set values Sp(t), Sn(t) of the emotion evaluation index. In the pseudo-emotion generating step S10, the pseudo-emotion is generated based on the set values Sp(t), Sn(t) of the emotion evaluation index.

In the evaluation index deriving step S3 (positive evaluation index deriving step S3P and negative evaluation index deriving step S3N), the emotion evaluation index is derived using a plurality of instantaneous values p(t), p(t−1), . . . , n(t), n(t−1), . . . which are sequentially derived at predetermined time intervals.

This method uses a plurality of instantaneous values p(t), p(t−1), . . . , n(t), n(t−1), . . . which are derived at different time points. That is, past values of the emotion evaluation index are used for numerical rating of emotions, and the emotion generated reflects past situations. The handling feeling experienced by the driver does not change instantaneously, and the current emotion is influenced by a past event. The manner in which the emotion evaluation index changes over time can be coordinated with the manner in which the handling feeling experienced by the driver changes. Thus, the correlation between the pseudo-emotion of the vehicle and the handling feeling experienced by the driver can be further enhanced.

In the evaluation index deriving step S3 (positive evaluation index deriving step S3P and negative evaluation index deriving step S3N), a first instantaneous value of the plurality of instantaneous value p(t), p(t−1), . . . , n(t), n(t−1), . . . used for derivation of the emotion evaluation index Sp(t), Sn(t) may have a larger influence on the emotion evaluation index Sp(t), Sn(t) than a second instantaneous value derived before derivation of the first instantaneous value. Although the handling feeling experienced by the driver does not change instantaneously, the influence exerted by a past event on the current emotion decreases with time. With the method described above, the emotion evaluation index Sp(t), Sn(t) is derived in such a manner that the influence exerted by past values of the emotion evaluation index on the current emotion decreases with time. The influence of time on the emotion evaluation index Sp(t), Sn(t) can be coordinated with the influence of time on the handling feeling experienced by the driver. Thus, the correlation between the pseudo-emotion of the vehicle and the handling feeling experienced by the driver can be further enhanced.

Both the positive emotion evaluation index and the emotion evaluation index are calculated to be expressed as level-indicating values (rating values). As such, when two emotions are synthesized to give an overall evaluation index TL, the difference in scale and/or dimension between the parameters can be resolved. Thus, an overall emotion can easily be generated.

If the horizontal force exceeds the limit of a so-called friction circle, the wheels 91 and 92 skid. A skilled driver can operate the vehicle in such a manner that a large horizontal force is applied to the wheels 91 and 92. The higher the driving skill of the driver is, the higher the intensity of a pleasant pseudo-emotion of the vehicle is. Under a condition where the wheels 91 and 92 can easily slip, even a driver of high driving skill has difficulty continuing operating the vehicle in such a manner that a large horizontal force is applied to the wheels 91 and 92, since the size of the friction circle varies depending on the friction coefficient of the ground surface. With the pseudo-emotion generation logic described above, the pseudo-emotion of the vehicle tends to be negative during travel on a ground surface on which the wheels 91 and 92 can easily slip. The pseudo-emotion generation based on the tire force not only provides enhancement of the correlation with the handling feeling experienced by the driver but also allows generation of an emotion matched to the driving skill or the ground surface condition.

The tire force exerted on the wheel(s) varies depending on the degree of the driver's proficiency in maneuvering the vehicle. In the present embodiment, since the pseudo-emotion changes depending on the tire force, the emotion to be generated can be varied depending on the driving skill. The tire force to be exerted changes also depending on the vehicle, such as depending on the output characteristics, the characteristics of motion in response to maneuvers, and the tire grip. In the present embodiment, since the pseudo-emotion changes depending on the tire force, the emotion to be generated can be varied depending on the vehicle. The tire force to be exerted on the wheel(s) changes also depending on the travel road, such as whether the road is a low μ road or a winding road consisting of a succession of curves. In the present embodiment, since the pseudo-emotion changes depending on the tire force, the emotion to be generated can be varied depending on the travel road-related factors such as the condition of the ground surface and the travel route.

While an embodiment of the present invention has been described above, modifications, additions, and/or omissions may be made to the above-described configuration within the scope of the present invention.

In the evaluation index deriving step S3, when the set value of the emotion evaluation index is derived by correcting the latest value of a plurality of derived instantaneous values, the instantaneous values themselves need not be used. The change over time in the instantaneous value may be derived, and the set value may be derived in such a manner that the change over time in the set value is smaller than the change over time in the instantaneous value. In this case, frequent change of the pseudo-emotion can be prevented. As previously mentioned, the handling feeling experienced by the driver does not change instantaneously, and the current emotion may be affected by a past event. The manner in which the pseudo-emotion of the vehicle changes over time can be coordinated with the manner in which the handling feeling experienced by the driver changes over time, and the correlation between the pseudo-emotion of the vehicle and the handling feeling experienced by the driver can be enhanced.

The up-down vibration value may be derived based on a parameter other than the acceleration in the upward/downward direction. If an unpleasant up-down vibration frequency range is predefined over which the driver would experience a feeling of unpleasantness, the negative evaluation index may be increased as the amplitude of the vibration in the unpleasant up-down vibration frequency range increases.

The negative parameter is not limited to the up-down vibration value and may be pitch vibration involving angular displacement about an axis extending in the vehicle width direction. The negative parameter may further include a parameter which can be a cause of fatigue of the driver. Specifically, the negative parameter may include the outside temperature, the weather, the time of day of travel, the period of time of travel, and the travel distance. For example, the driver tends to get fatigued during travel at high temperature or low temperature (an outside temperature falling outside a suitable range), during travel in the rain and/or strong wind, during travel at night, during long-time travel, or during long-distance travel. During these kinds of travel, the negative evaluation index may be corrected to be higher. The input parameter (positive parameter or negative parameter) may include a slip occurrence state or an error occurrence state detected by self-diagnosis of the vehicle body.

The rating of emotions may be any rating in which the emotions are ranked relative to one another (or by which the magnitude relationship between the emotions is determined). That is, the present invention includes embodiments in which emotions are not represented by numerical values.

The present invention includes embodiments in which the positive evaluation and the negative evaluation are not synthesized or combined and in which positive and negative emotions based on the positive and negative evaluations are individually output. The present invention includes embodiments in which either the positive evaluation or the negative evaluation is output.

While in the above embodiment both the tire force exerted on the front wheel and the tire force exerted on the rear wheel (the front wheel force and the rear wheel force) are used to derive the positive evaluation index, only the tire force exerted on either of the wheels may be used to derive the positive evaluation index. When the tire forces exerted on the two wheels are used, the influence of the tire force on the positive evaluation index may be varied for each wheel. For example, in determination of the positive evaluation index, the tire force exerted on the drive wheel for which the longitudinal force component is generated not only during deceleration but also during acceleration may be more weighted than the tire force exerted on the driven wheel.

When the function for determining the evaluation index is varied between the front wheel and the rear wheel, adjustment allowance for derivation of the evaluation index can be widened.

In the above embodiment, when the positive evaluation index is derived taking into consideration both the longitudinal force component and the lateral force component, the positive evaluation index is defined as a function of the longitudinal force component and the lateral force component, and the positive evaluation index can be derived by an arithmetic expression representing the function. The specific way of deriving the positive evaluation index based on the longitudinal force component and the lateral force component is not limited to the use of an arithmetic expression, and two-dimensional or three-dimensional mapping may be used for derivation of the positive evaluation index.

While in the above embodiment an integral calculated taking into consideration past values is used to prevent rapid change of the pseudo-emotion to be generated, the way of preventing such a change may be varied as appropriate. For example, the upper limit of the resulting evaluation index may be set for each temporal change to prevent the amount of change with respect to a reference value (e.g., a previous value) from exceeding a predetermined level. Further, a computational technique such as smoothing process, low-pass filter process, or n-th order lag process may be used.

While in the above embodiment the tire force obtained is used to derive the positive evaluation index as a rating of a positive evaluation for a pseudo-emotion of the vehicle, the tire force obtained may be used to derive a "positive evaluation related to travel" which is other than a positive evaluation for a pseudo-emotion. That is, the logic of deriving a positive evaluation index based on a tire force is applicable not only to pseudo-emotion generation but also to a method of making an evaluation related to travel of a vehicle including a wheel (travel evaluation method). An exemplary parameter that can be evaluated based on a tire force is driving skill. The higher the driving skill is, the higher the positive evaluation index is.

The travel evaluation method includes a tire force obtaining step similar to that of the above-described pseudo-emotion generation method and an evaluation index deriving step of deriving an evaluation index related to travel of a vehicle. In the evaluation index deriving step, the evaluation index includes a positive evaluation index as a rating of a positive evaluation related to travel. In other words, the evaluation index deriving step includes a positive evaluation index deriving step of deriving such a positive evaluation index. In the evaluation index deriving step (positive evaluation index deriving step), the positive evaluation index is derived based on the tire force in such a manner that the larger the tire force is, the higher the positive evaluation index is.

In the evaluation index deriving step, the positive evaluation index may be corrected based on an influential parameter other than the tire force. Examples of such an influential parameter include a leaning value, a traffic jam value, and a longitudinal-lateral weighting value.

The leaning value is an influential parameter which is set when a predetermined correction state (or condition) is established during a leaning-position travel period in which the vehicle is in a leaning-position travel state. Examples of the leaning value include a slow-speed turning value and an alternate clockwise-counterclockwise turning value.

The slow-speed turning value is set when a condition that the speed of the vehicle is equal to or lower than a predetermined vehicle speed is satisfied during the leaning-position travel period. Once the slow-speed turning value is set, the positive evaluation index derived based on the tire force is corrected to be lower. The logic of outputting a better emotion upon an increase in tire force is implicitly based on the assumption that the vehicle runs at a sufficient speed during travel in a curve. In travel through an urban zone, when making a left or right turn at a traffic intersection, the vehicle runs at a slow speed with its vehicle body inclined. In such a situation, although a lateral force is generated, the emotion is not necessarily influenced positively. Thus, even if the tire force (in particular, the lateral force for the assumption on which the logic is based) is generated and the positive evaluation index has a relatively high value, the positive evaluation index is decreased depending on the slow-speed turning value when the speed of the vehicle is equal to or lower than the predetermined vehicle speed (e.g., 20 km/h). As such, overvaluation of a positive influence on the emotion can be avoided when the vehicle is turning at a slow speed, such as during left or right turn at a traffic intersection.

The alternate clockwise-counterclockwise turning value is set when a condition that the vehicle is in an alternate clockwise-counterclockwise turning state is satisfied during the leaning-position travel period. The alternate clockwise-counterclockwise turning state is a state where the vehicle is banked alternately in opposite directions. Once the alternate clockwise-counterclockwise turning value is set, the positive evaluation index derived based on the tire force is corrected to be higher. The situation where the vehicle is banked alternately in opposite directions can occur, for example, during travel on a winding road. During such travel, the driver controls the position of the vehicle body and his/her own posture in accordance with the road. This situation can be considered to positively influence the emotion of the driver. In the course of change of the bank direction, there is a moment when the vehicle body becomes upright. When the vehicle body is upright or little inclined, no lateral force is generated, and the positive evaluation index derived based on the tire force has a relatively small value. Thus, in the alternate clockwise-counterclockwise turning state, even if the tire force (in particular, the lateral force for the assumption on which the logic is based) is small and the positive evaluation index has a relatively small value, the positive evaluation index is increased depending on the alternate clockwise-counterclockwise turning value. As such, undervaluation of a positive emotion can be avoided during alternate clockwise-counterclockwise turning.

Whether the vehicle is in the alternate clockwise-counterclockwise turning state is determined based on at least one of the roll rate (bank angle $\beta\bullet$) and the steering torque. During alternate clockwise-counterclockwise turning, both the roll rate and the steering torque reach peaks when the bank angle is around zero. During continuous straight travel, the bank angle is approximately zero, and both the roll rate and the steering torque are approximately zero. Thus, whether the alternate clockwise-counterclockwise turning is being performed can be accurately determined based on the roll rate and the steering torque. If the determination is made using both the roll rate and the steering torque, the alternate clockwise-counterclockwise turning value may be set in such a manner that the smaller is a time difference between when the roll rate reaches a peak and when the steering torque reaches a peak, the larger the alternate clockwise-counterclockwise turning value is. The time difference is smaller as the alternate clockwise-counterclockwise turning is performed at a higher vehicle speed. The higher is the vehicle speed during the alternate clockwise-counterclockwise turning, the higher are the alternate clockwise-counterclockwise turning value and the positive evaluation index, and thus the stronger is the correlation between the travel situation and the emotion. It is difficult to actually measure the time difference between the moments when the peaks are reached and use the time difference as an input parameter. A product of the roll rate and the steering torque is a value serving as a good indication of the time difference between the moments when the peaks are reached. Thus, the alternate clockwise-counterclockwise turning value may be derived based on the product of the roll rate and the steering torque. This product increases as the time difference decreases, assuming that the peaks of the roll rate and the steering torque remain unchanged. As such, when the time difference is not actually measured, the product is effectively used as an alternative parameter. The steering torque generated during alternate clockwise-counterclockwise turning largely depends on a gyro effect acting on the steerable wheel (front wheel). The gyro effect acting on the front wheel is proportional to the rotational speed of the front wheel. In order to prevent the positive influence on the emotion from being overvalued due to a high rotational speed of the front wheel, the alternate clockwise-counterclockwise turning value may be derived by making a correction in which the product of the roll rate and the steering torque is decreased by the rotational speed of the front wheel or a torque component generated due to the gyro effect.

The traffic jam value is an influential parameter which is set when the vehicle is in a traffic jam travel state. Once the traffic jam value is set, the evaluation index is corrected to decrease the positive evaluation index. Alternatively, the evaluation index is corrected to increase the negative evaluation index. The traffic jam value is derived from a function of the vehicle speed and the acceleration. The traffic jam value to be set is different between when the acceleration is positive (when the vehicle is accelerated or when the vehicle leaves a traffic jam) and when the acceleration is negative (when the vehicle is decelerated or when the vehicle enters a traffic jam) even if the absolute value of the acceleration is the same. For example, the traffic jam value Pjam may be derived by the following equation (11).

$$P\text{jam}=V(t)\times|a(t)|\times\delta(a(t)) \quad (11)$$

In this equation, V(t) represents the vehicle speed, a(t) represents the vehicle body acceleration in the forward/rearward direction, and $\delta(a(t))$ represents a weighting coefficient determined based on whether the vehicle is accelerated or decelerated. In a situation where the vehicle speed is low and the vehicle cannot be accelerated or decelerated, both V(t) and a(t) are close to zero, so that the traffic jam value Pjam is small. In this example, a smaller traffic jam value Pjam indicates a heavier traffic jam, and a decrease in the traffic jam value Pjam leads to a decrease in the positive evaluation index. If the vehicle body acceleration is positive (during acceleration), this typically means that the vehicle is leaving a traffic jam, while if the vehicle body acceleration is negative (during deceleration), this typically means that the vehicle is entering a traffic jam. Thus, the value of the weighting coefficient $\delta(a(t))$ is varied depending on whether the acceleration is positive or negative so that the positive evaluation index is lower when the vehicle is entering a traffic jam than when the vehicle is leaving a traffic jam, assuming the same vehicle speed and the same acceleration absolute value. In this example, since a decrease in the traffic jam value Pjam leads to a decrease in the positive evaluation index, a weighting coefficient set when the acceleration is negative is smaller than a weighting coefficient set when the acceleration is positive. Thus, the correlation between the travel situation and the evaluation content is enhanced.

The longitudinal-lateral weighting value is an influential parameter set to vary and adjust the weighting for the positive evaluation index depending on the longitudinal force component and the lateral force component of the tire force. The equation (1) presented above indicates that the positive evaluation index (in particular an instantaneous value of the positive evaluation index) is derived from the longitudinal force component Fx and the lateral force component Fy. In the specific example previously described, the tire force is divided into the front wheel tire force and the rear wheel tire force as expressed by the equation (3). In the present example, the tire force is divided into longitudinal force components for the front and rear wheels and lateral force components for the front and rear wheels, and the longitudinal force components and the lateral force components are weighted differently.

For example, the positive evaluation index may be derived by the following equation (12) based on the tire force.

$$p(k)=w(|Fxf|+|Fxr|)+(2-w)(|Fyf|+|Fyr|) \quad (12)$$

In this equation, w is the longitudinal-lateral weighting value and is set to a numerical value ranging from 0 to 2. When the longitudinal-lateral weighting value is set to the lower limit (0 in this example), the longitudinal force components are eliminated from consideration and the lateral force components are doubled in deriving the positive evaluation index. When the longitudinal-lateral weighting value is set to the upper limit (2 in this example), the lateral force components are eliminated from consideration and the longitudinal force components are doubled in deriving the positive evaluation index.

As previously stated, the longitudinal force components are large when a torque is transmitted to the wheels from the drive source or the brake system, i.e., when the vehicle is sharply accelerated or decelerated. The lateral force components are large when the vehicle is making a turn with its vehicle body inclined. Drivers can be classified into those who attach importance to acceleration/deceleration (those who tend to experience a pleasant emotion during sharp acceleration/deceleration) and those who attach importance to turning (those who tend to experience a pleasant emotion when maintaining a high speed and/or inclining the vehicle body steeply during turning).

The longitudinal-lateral weighting value may be determined based on machine learning of tire forces obtained in the past or may be manually input by the driver. The longitudinal-lateral weighting value is set to a value appropriate for a travel pattern to which the driver attaches importance. This enhances the correlation between the taste of the driver and the evaluation content. Whether the driver is a beginning driver or a skilled driver may be determined based on the trend of the bank angle β, based on whether the driver prefers which of a straight path and a curved path, or based on the driving trend. A driver who often travels on a place where the vehicle is frequently subjected to up-down vibration tends to prefer travel on off-roads. For such a driver, the sensitivity to up-down vibration may be reduced, or the negative evaluation index may be kept from being set high when up-down vibration occurs.

When the leaning value is set, the evaluation index may be corrected based on accumulated past values. In this case, the evaluation index can be derived in such a manner that a near-past leaning value has a larger influence on the evaluation index than a far-past leaning value and that the influence of the far-past leaning value is left on the evaluation index. The correction based on the leaning value may be a correction to the positive evaluation index obtained based on the tire force or may be a correction to the overall evaluation index. The use of accumulated past values, and the modification in which the overall evaluation index is corrected, are applicable also to the correction based on the traffic jam value.

The slow-speed turning value may be obtained based on a parameter other than the vehicle speed, and may be obtained based on the centrifugal force, the turning radius, the amount of steering, the engine speed, location information, or map information. When the degree of slow-speed turning is high or when the number of times that slow-speed turning is performed is large, the positive evaluation index is corrected to be lower. The slow-speed turning value may be compared to at least one threshold, and the amount of decrease in the positive evaluation index may be determined in a range defined by the threshold. Setting the amount of decrease stepwise based on comparison with the threshold is applicable also to the correction based on the alternate clockwise-counterclockwise turning value.

The alternate clockwise-counterclockwise turning value may be obtained based on the amount of change in bank angle within a predetermined period of time. The alternate clockwise-counterclockwise turning value may be set to either of two values respectively representing the occurrence and non-occurrence of alternate clockwise-counterclockwise turning. In this case, the alternate clockwise-counterclockwise turning value may be set to the value representing the occurrence of alternate clockwise-counterclockwise turning when the bank angle changes by at least a predetermined amount from a bank angle in one direction to a bank angle in the opposite direction through a bank angle corresponding to the upright position. When it is determined based on the map information and the location information that the vehicle is traveling on an S-shaped route, the alternate clockwise-counterclockwise turning value may be set to the value representing the occurrence of alternate clockwise-counterclockwise turning.

The traffic jam value Pjam may be set based on information other than the vehicle speed and the acceleration. For example, the traffic jam value Pjam may be obtained based on inter-vehicle communication, the distance to a neighboring vehicle, or VICS (registered trademark) information.

Figure 8:
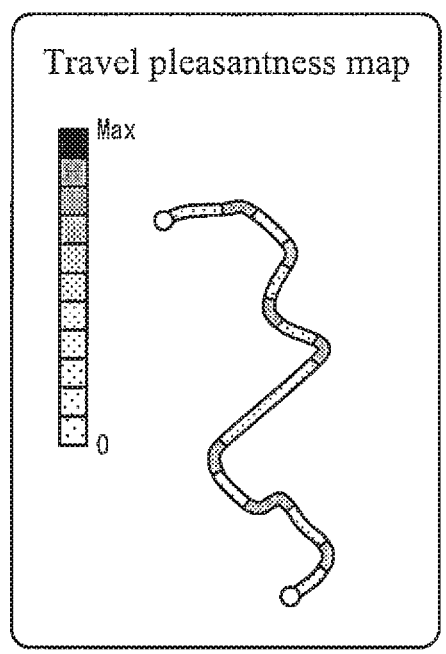
FIG. 8 is a diagram showing an example of how to display travel pleasantness on a display.

The travel-related evaluation made as described above can be said to indicate the pleasantness of travel as experienced by the driver. As shown in FIG. 8, the travel pleasantness may be superimposed on a map image displayed on a display of an information terminal carried by the driver.

A correction may be made based on a parameter other than the tire force to distinguish a leaning state where the driver experiences a pleasant feeling and another leaning state. A correction may be made depending on the vehicle type, the engine displacement, the style of the vehicle, the degree of proficiency of the driver, the type of the tire, or the travel road.

The above-described corrections using various influential parameters can provide improved accuracy of evaluation in different situations where other travel-related parameters such as the tire force are the same.

Figure 7:
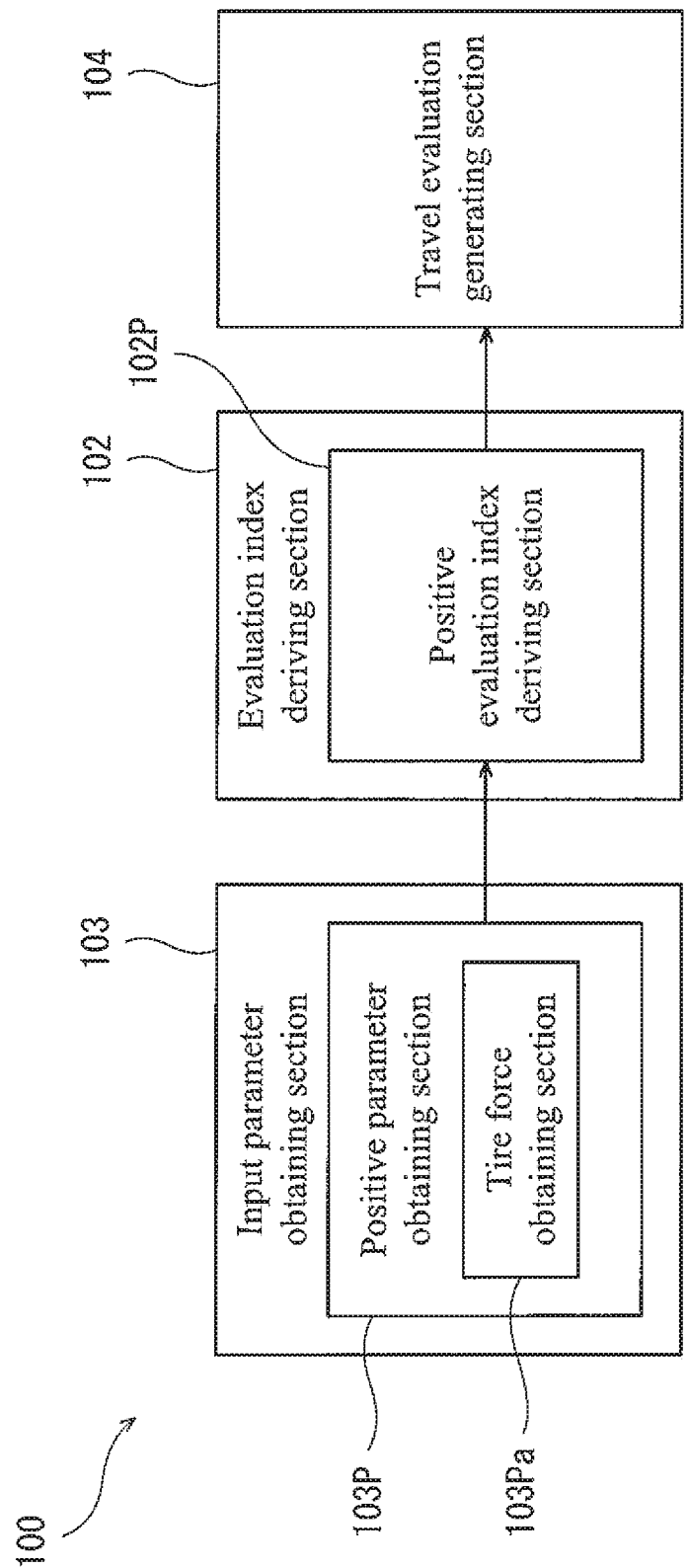
FIG. 7 is a conceptual diagram showing a travel evaluation system.

FIG. 7 is a conceptual diagram of a travel evaluation system. The travel evaluation system 100 includes an evaluation index deriving section 102 that derives an evaluation index as a rating of an evaluation related to travel, and an input parameter obtaining section 103 that obtains an input parameter used by the evaluation index deriving section 102 to derive the evaluation index. The travel evaluation system 100 further includes a travel evaluation generating section 104 that generates and/or outputs the evaluation related to travel based on the evaluation index derived by the evaluation index deriving section 102. As in the pseudo-emotion generation system 1 (see FIG. 1), the input parameter obtaining section 103 includes a positive parameter obtaining section 103P, and the positive parameter obtaining section 103P includes a tire force obtaining section 103 Pa that obtains a tire force exerted on a wheel from the ground surface. The evaluation index deriving section 102 derives a positive evaluation index based on the tire force obtained by the tire force obtaining section 103Pa in such a manner that the larger the tire force is, the higher the positive evaluation index is.

The travel evaluation system 100 may obtain GPS information, driver identification information, vehicle identification information, and/or vehicle setting information as the input parameter. The travel evaluation system 100 may store evaluation indices derived for a plurality of vehicles (a plurality of drivers). In this case, the evaluation indices may be stored in association not only with driver information and vehicle type information but also with location information (travel route information). The evaluation related to travel can be analyzed based on the stored evaluation indices and the information associated with the indices.

The travel evaluation system 100 may, upon a request from a driver, output an evaluation result and information representing a travel route. In this case, the destination of the output may be a display device provided in the vicinity of the handle of the vehicle or a display of a terminal device carried by the driver. Thus, the driver can be informed of a highly evaluated travel route. For example, the driver can be informed of a travel route on which the driver is likely to experience a pleasant emotion. Information about a highly evaluated travel route can be shared by a plurality of drivers. Additionally, past driving history of a plurality of drivers and stored evaluation indices can be used to present a highly evaluated travel route depending on the driver or the type of the vehicle.

The travel evaluation system 100 may, upon a request from a driver, output an evaluation result and information representing driver information and vehicle type information. Thus, the driver who made the request can be informed of a highly evaluated vehicle and/or a highly evaluated driver.

The travel evaluation system 100 may, upon a request from a driver, output a highly evaluated travel route depending on the driving trend and the vehicle body. The system may output ranking information of drivers or vehicles.

The hardware that executes the pseudo-emotion generation method can be embodied by a control unit mounted in the vehicle, a terminal device carried by the driver, or a server physically separate from the vehicle. All of the control unit, the terminal device, and the server include a processor, a volatile memory, a non-volatile memory, and an I/O interface. The non-volatile memory stores a program related to the procedures of the pseudo-emotion generation method, and the processor executes the program to perform processing operations using the volatile memory. The hardware that executes the travel evaluation method is configured similarly to the hardware that executes the pseudo-emotion generation method, and includes a non-volatile memory storing a program related to the procedures of the travel evaluation method. The input parameter obtaining section 3 or 103, the evaluation index deriving section 2 or 102, and the pseudo-emotion generating section 4 or travel evaluation generating section 104 are implemented by execution of the program.

While in the above embodiment a pseudo-emotion of a motorcycle is generated, the pseudo-emotion generation method is applicable to a vehicle (e.g., a four-wheeled vehicle) other than motorcycles. Nevertheless, in view of enhancement of the correlation between the handling feeling experienced by the driver and the pseudo-emotion of the vehicle, in view of the use of the tire force as means for establishing the correlation, and in view of the adjustability of the lateral force component of the tire force by inclination of the vehicle body, the method is beneficial particularly when applied to generation of a pseudo-emotion of a leaning vehicle (such as a motorcycle or a buggy) that makes a turn in a banked position where the vehicle body is inclined about the front-rear axis.

REFERENCE CHARACTERS LIST

1 Pseudo-emotion generation system
2 Evaluation index deriving section
3Pa Tire force obtaining section
3Na Up-down vibration value obtaining section
4 Pseudo-emotion generating section
90 Motorcycle
91 Front wheel
92 Rear wheel
Fx, Fxf, Fxr Longitudinal force component
Fy, Fyf, Fyr Lateral force component
v Up-down vibration value
p(k) Instantaneous value of positive evaluation index
p(t) Latest value of positive evaluation index
Sp(t) Set value of positive evaluation index
n(k) Instantaneous value of negative evaluation index
n(t) Latest value of negative evaluation index
Sn(t) Set value of negative evaluation index
TL Overall evaluation index
S1 Tire force obtaining step
S2 Up-down vibration value obtaining step
S3 Evaluation index deriving step
S10 Pseudo-emotion generating step

The invention claimed is:

1. A travel evaluation method of making an evaluation related to travel of a vehicle, the method comprising:
at a processor configured to execute instructions to perform processing operations:
obtaining, from a tire force obtaining section including one or more sensors, a tire force which is an external force exerted on a wheel of the vehicle from a ground surface and which includes a lateral force component;
deriving an evaluation index related to travel of the vehicle, wherein
the evaluation index includes a positive evaluation index as a rating of a positive evaluation related to travel of the vehicle, the positive evaluation representing pleasantness of travel,
in deriving the evaluation index, an instantaneous value of the positive evaluation index is based on the tire force,
in deriving the evaluation index, the instantaneous value of the positive evaluation index is set higher as the tire force increases,
in deriving the evaluation index, the evaluation index is corrected based on an influential parameter other than the tire force, and
in deriving the evaluation index, the evaluation index is corrected to increase the positive evaluation index related to travel when the vehicle is determined to be in an alternate clockwise-counterclockwise turning state where the vehicle is banked alternately in opposite directions; and
outputting, as an evaluation result, a value of the corrected evaluation index for a travel route on which the vehicle was traveling when the evaluation index was derived.

2. The travel evaluation method according to claim 1, wherein in deriving the evaluation index, an influential parameter for correcting the positive evaluation obtained based on the tire force is set when a predetermined correction state is established during a leaning-position travel period in which the vehicle travels in a leaning position.

3. The travel evaluation method according to claim 1, wherein in deriving the evaluation index, the evaluation index is corrected to decrease the positive evaluation index when the vehicle is determined to be in a slow-speed turning state.

4. The travel evaluation method according to claim 1, wherein in deriving the evaluation index, the evaluation index is corrected to decrease the positive evaluation index when the vehicle is determined to be in a traffic jam travel state.

5. The travel evaluation method according to claim 4, wherein in deriving the evaluation index, whether the vehicle is in the traffic jam travel state is determined based on both a vehicle speed and an acceleration in a forward/rearward direction.

6. The travel evaluation method according to claim 1, wherein in deriving the evaluation index, the influential parameter is set depending on a past trend of travel or depending on the driver of the vehicle.

7. The travel evaluation method according to claim 1, wherein
the tire force includes a forward/rearward force component exerted in a forward/rearward direction and the lateral force component exerted in a leftward/rightward direction, and
in deriving the evaluation index, the evaluation index is corrected by weighting the forward/rearward force component and the lateral force component differently.

8. The travel evaluation method according to claim 1, wherein a plurality of evaluation indices for a plurality of vehicles is stored in association with location information for the travel route.

9. The travel evaluation method according to claim 8, wherein, in response to a request from a driver, a ranking of the travel route based on the stored plurality of evaluation indices is output to the driver.

10. The travel evaluation method according to claim 1, wherein, in deriving the evaluation index, the instantaneous value of the positive evaluation index is set high when the driver is performing a throttling maneuver, a braking maneuver, or a vehicle body banking maneuver.

11. A travel evaluation method of making an evaluation related to travel of a vehicle, the method comprising:
at a processor configured to execute instructions to perform processing operations:
obtaining, from a tire force obtaining section including one or more sensors, a tire force which is an external force exerted on a wheel of the vehicle from a ground surface and which includes a lateral force component;

deriving an evaluation index related to travel of the vehicle, wherein
the evaluation index includes a positive evaluation index as a rating of a positive evaluation related to travel of the vehicle, the positive evaluation representing pleasantness of travel,
in deriving the evaluation index, an instantaneous value of the positive evaluation index is based on the tire force,
in deriving the evaluation index, the instantaneous value of the positive evaluation index is set higher as the tire force increases,
in deriving the evaluation index, the evaluation index is corrected based on an influential parameter other than the tire force, and
in deriving the evaluation index, the evaluation index is corrected to increase the positive evaluation index related to travel when the vehicle is determined to be in a travel state where at least one of a roll rate and a steering torque of the vehicle in an upright position is higher than a comparison value predetermined for alternate clockwise-counterclockwise turning; and
outputting, as an evaluation result, a value of the corrected evaluation index for a travel route on which the vehicle was traveling when the evaluation index was derived.

12. A pseudo-emotion generation method of generating a pseudo-emotion of a vehicle, the method comprising:
obtaining a tire force which is an external force exerted on a wheel of the vehicle from a ground surface and which includes a lateral force component;
deriving an emotion evaluation index, wherein
the emotion evaluation index includes a positive evaluation index as a rating of a positive pseudo-emotion, the positive pseudo-emotion representing pleasantness of travel experienced by a driver,
in deriving the emotion evaluation index, a value of the positive evaluation index is based on the tire force,
in deriving the emotion evaluation index, the value of the positive evaluation index is set higher as the tire force increases,
in deriving the emotion evaluation index, the emotion evaluation index is corrected based on an influential parameter other than the tire force, and
in deriving the emotion evaluation index, the emotion evaluation index is corrected to increase the positive evaluation index related to travel when the vehicle is determined to be in an alternate clockwise-counterclockwise turning state where the vehicle is banked alternately in opposite directions;
generating a pseudo-emotion based on the derived emotion evaluation index; and
outputting, as an evaluation result, a value of the corrected emotion evaluation index for a travel route on which the vehicle was traveling when the evaluation index was derived.

13. A pseudo-emotion generation method of generating a pseudo-emotion of a vehicle, the method comprising:
obtaining a tire force which is an external force exerted on a wheel of the vehicle from a ground surface and which includes a lateral force component;
deriving an emotion evaluation index, wherein
the emotion evaluation index includes a positive evaluation index as a rating of a positive pseudo-emotion, the positive pseudo-emotion representing pleasantness of travel experienced by a driver,
in deriving the emotion evaluation index, a value of the positive evaluation index is based on the tire force,
in deriving the emotion evaluation index, the value of the positive evaluation index is set higher as the tire force increases,
in deriving the emotion evaluation index, the emotion evaluation index is corrected based on an influential parameter other than the tire force, and
in deriving the evaluation index, the evaluation index is corrected to increase the positive evaluation index related to travel when the vehicle is determined to be in a travel state where at least one of a roll rate and a steering torque of the vehicle in an upright position is higher than a comparison value predetermined for alternate clockwise-counterclockwise turning;
generating a pseudo-emotion based on the derived emotion evaluation index; and
outputting, as an evaluation result, a value of the corrected emotion evaluation index for a travel route on which the vehicle was traveling when the evaluation index was derived.

* * * * *